US012521058B2

(12) United States Patent
Voor et al.

(10) Patent No.: US 12,521,058 B2
(45) Date of Patent: Jan. 13, 2026

(54) MEDICAL DEVICE FOR INTRAOPERATIVE MEASUREMENT AND INTERPRETATION OF BONE DENSITY DURING SPINAL SURGERY

(71) Applicant: University of Louisville Research Foundation, Inc., Louisville, KY (US)

(72) Inventors: Michael J. Voor, Louisville, KY (US); Stuart J. Williams, Prospect, KY (US); Maxwell Boakye, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 568 days.

(21) Appl. No.: 17/923,830

(22) PCT Filed: May 5, 2021

(86) PCT No.: PCT/US2021/030914
§ 371 (c)(1),
(2) Date: Nov. 7, 2022

(87) PCT Pub. No.: WO2021/226252
PCT Pub. Date: Nov. 11, 2021

(65) Prior Publication Data
US 2023/0172531 A1    Jun. 8, 2023

Related U.S. Application Data

(60) Provisional application No. 63/020,263, filed on May 5, 2020.

(51) Int. Cl.
*A61B 5/00* (2006.01)
*A61B 17/56* (2006.01)
(Continued)

(52) U.S. Cl.
CPC .......... *A61B 5/4504* (2013.01); *A61B 5/0053* (2013.01); *A61B 5/4566* (2013.01);
(Continued)

(58) Field of Classification Search
CPC ....... A61B 5/4504; A61B 5/45; A61B 5/4509; A61B 5/68; A61B 5/6846; A61B 5/0053;
(Continued)

(56) References Cited

U.S. PATENT DOCUMENTS

2003/0187348 A1* 10/2003 Goodwin ........... A61B 17/1671
606/130
2008/0195102 A1    8/2008 Glazer
(Continued)

FOREIGN PATENT DOCUMENTS

WO    WO 2021/226252 A1    11/2021

OTHER PUBLICATIONS

International Search Report and Written Opinion corresponding to International Patent Application Serial No. PCT/US2021/030914 dated Aug. 12, 2021.

*Primary Examiner* — Marcela I. Shirsat
(74) *Attorney, Agent, or Firm* — Meunier Carlin & Curfman LLC

(57) ABSTRACT

Provided are bone quality and/or strength measuring devices. In some embodiments, the devices include a body and a detector disposed therein designed to interact with a bone, determine the quality and/or strength thereof, and communicate an evaluation thereof to a user. The presently disclosed devices can also include a torque and/or force sensor that facilitates placement of the device and/or that is in communication with the detector to cause the detector to evaluate the bone; an output that feedback to a user based on the quality and/or strength of the bone determined by the detector, and/or a piston that interacts with the detector to
(Continued)

cause the detector to interact with and thereby evaluate the bone. Also provided are methods for determining if a region of a bone is appropriate for placement of an orthopedic hardware piece and methods for reducing risk of a complication of spinal surgery associated with failure of an orthopedic hardware piece.

15 Claims, 18 Drawing Sheets

(51) Int. Cl.
    *A61B 17/70*     (2006.01)
    *A61B 90/00*     (2016.01)
    *A61F 2/46*     (2006.01)

(52) U.S. Cl.
    CPC ........ *A61B 5/6878* (2013.01); *A61B 17/7001* (2013.01); *A61B 5/4509* (2013.01); *A61B 5/6846* (2013.01); *A61B 2017/564* (2013.01); *A61B 17/7005* (2013.01); *A61B 17/7032* (2013.01); *A61B 17/7035* (2013.01); *A61B 2090/064* (2016.02); *A61B 2090/065* (2016.02); *A61B 2090/066* (2016.02); *A61F 2/4657* (2013.01); *A61F 2002/4666* (2013.01); *A61F 2002/4667* (2013.01)

(58) Field of Classification Search
    CPC ................ A61B 5/4566; A61B 5/6878; A61B 2090/064; A61B 2090/065; A61B 2090/066; A61B 17/7001; A61B 17/70; A61B 17/7005; A61B 17/7032; A61B 17/7035; A61B 2017/564; A61F 2/4657; A61F 2002/4666; A61F 2002/4667
    USPC .................................. 600/587, 594; 606/102
    See application file for complete search history.

(56) References Cited

U.S. PATENT DOCUMENTS

| | | |
|---|---|---|
| 2013/0079679 A1 | 3/2013 | Roche et al. |
| 2013/0096566 A1 | 4/2013 | Bowen et al. |
| 2013/0110120 A1* | 5/2013 | Baroud .............. A61B 17/3472 606/102 |
| 2021/0322079 A1* | 10/2021 | Aryan ................ A61B 17/7076 |

* cited by examiner

VARIABLE BONE QUALITY TEST BLOCK

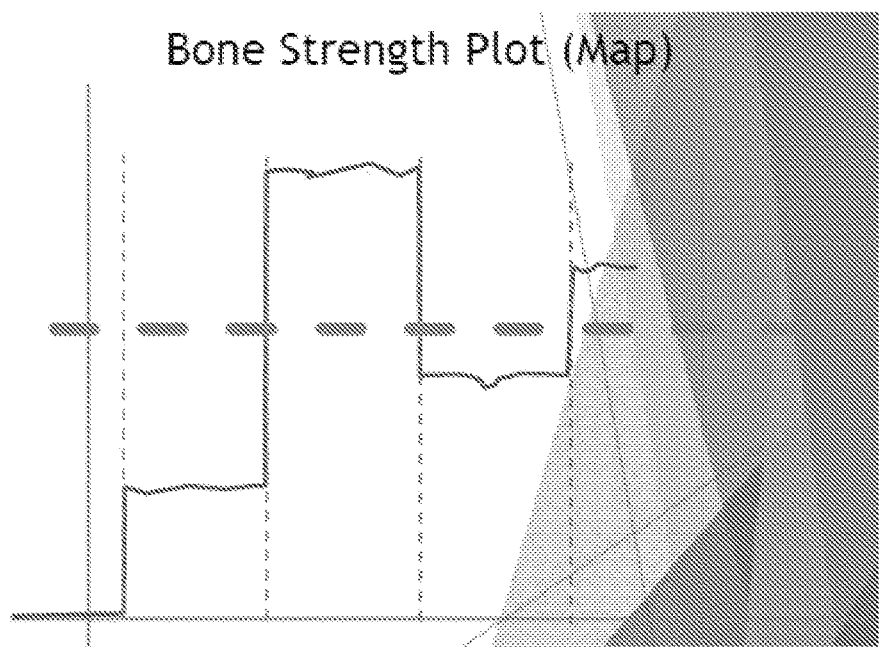
*FIG. 5C*
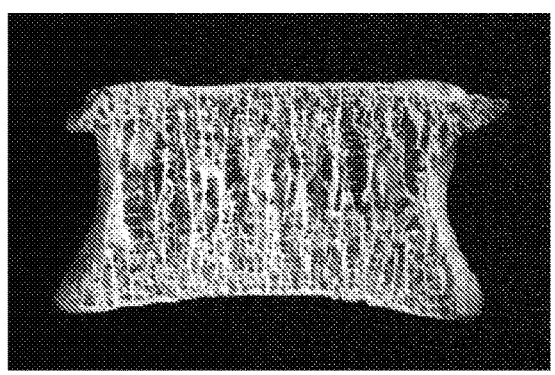
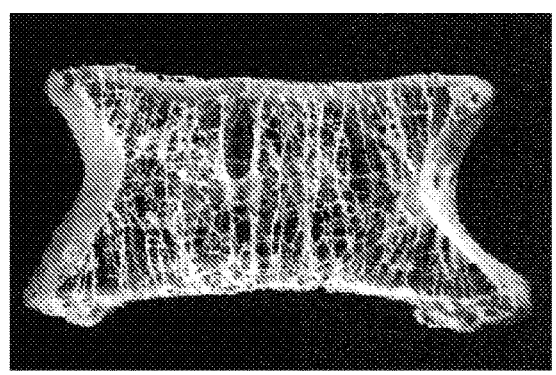
*FIG. 6A*  *FIG. 6B*

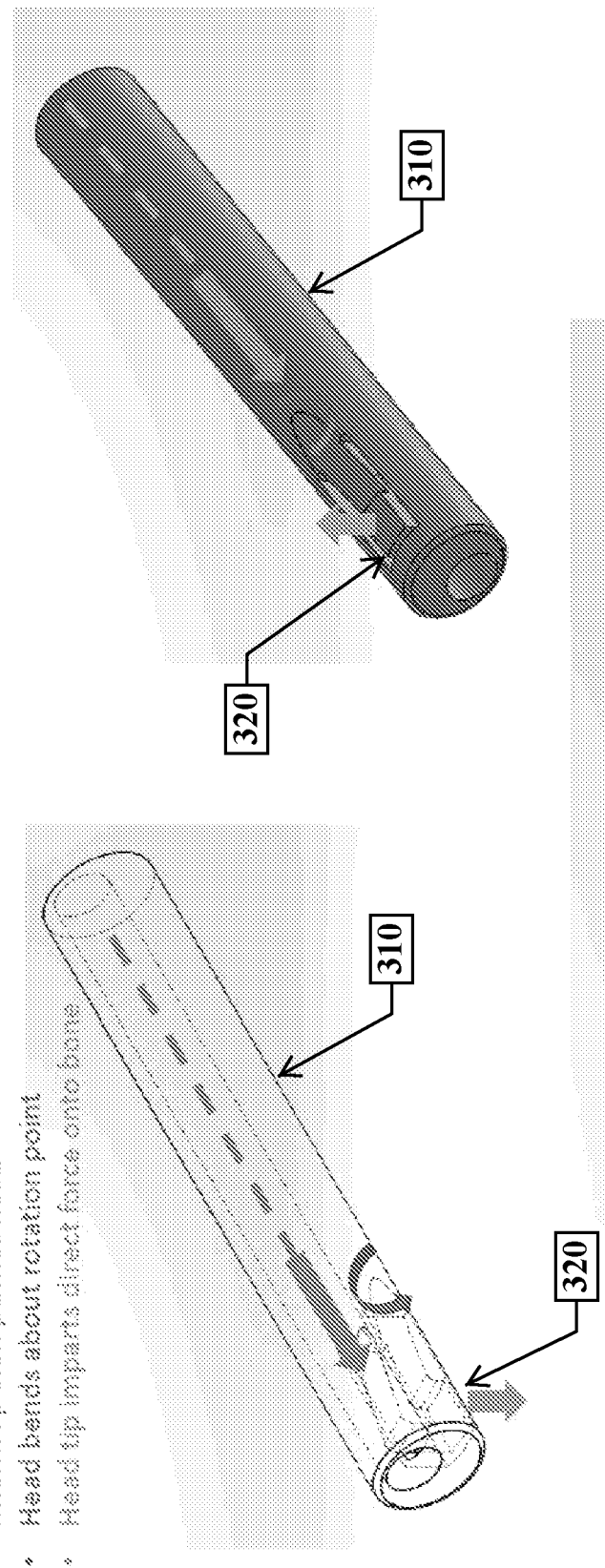
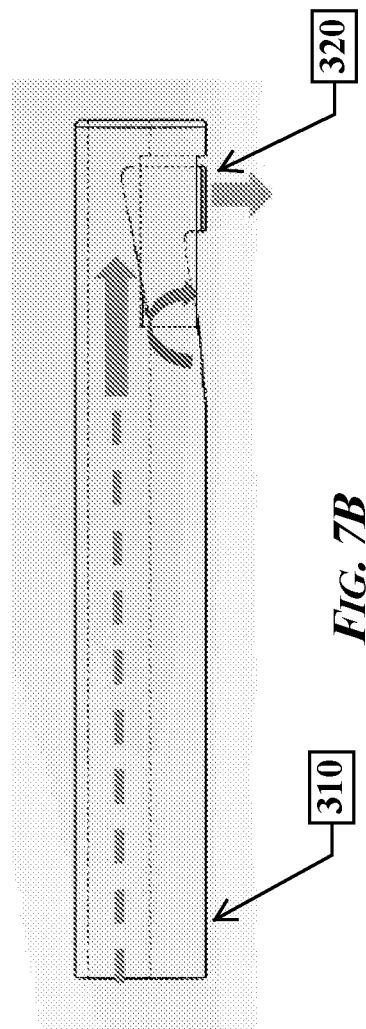
FIG. 7B

- Manual testing with 8.0 mm holds in foam blocks.
- Could manually differentiate between four types of blocks (2.1 MPa to 14 MPa)

MEDICAL DEVICE FOR INTRAOPERATIVE MEASUREMENT AND INTERPRETATION OF BONE DENSITY DURING SPINAL SURGERY

CROSS REFERENCE TO RELATED APPLICATION

This application claims the benefit of U.S. Provisional Patent Application Ser. No. 63/020,263, filed May 5, 2020, the disclosure of which is incorporated herein by reference in its entirety.

GOVERNMENT INTEREST

This invention was made with government support under grant number HL127518-01 awarded by the National Institutes of Health. The government has certain rights in the invention.

TECHNICAL FIELD

The presently disclosed subject matter relates generally to a medical device that can measure mechanical bone quality (strength) intraoperatively during spine surgery. In some embodiments, the device includes hardware and/or software that provides visual, auditory, and/or tactile feedback depending on the measurement taken to thus provide a user with guidance to management of poor bone quality measurements. Until now, estimates of bone density have been used as an indirect measure of bone quality with inconsistent results.

BACKGROUND

The rates of spine surgery are increasing with over 250,000 fusions performed per year. Over 50 million Americans have low bone mass or osteoporotic bone (Wright et al., 2014). Elderly patients with osteoporosis are at risk for vertebral fractures that generally require surgical repair. The rates of spinal surgery are likely to continue to increase into the next decade (Park & Chung, 2011; Martin et al., 2019).

With the growing elderly population, an increasing number of spine surgeries will need to be performed in osteoporotic patients (Kha et al., 2018; Martin et al., 2019). Therefore, there is likely going to be an exponential increase in the number of patients with osteoporosis who need spine surgery. The risks of complications after spinal surgery are much greater in osteoporotic patients due to poor bone quality, and failure of spinal surgery in osteoporotic patients are well documented in numerous studies (Lehman et al., 2015; Kha et al., 2018; Bjerke et al., 2018). Each failure leads to enormous health resource consumption and poor quality of life for patients. Mechanisms of failure include failure of the fusion and/or failure of instrumentation due to bone fragility.

Several osteoporosis-related spinal instrumentation complications can be avoided if the surgeon is aware that the patient has poor bone quality and employs a number of evidence-based strategies to alter the applied surgical technique and mitigate the risk of failure (Lehman et al., 2015; Fischer et al., 2016; Bjerke et al., 2018). These include but are not limited to using longer bicortical screws, adding additional levels of surgery, adding interbody fusion, and cement augmentation of screws. A difficulty, however, is that surgeons are often not aware of the exact bone strength and/or quality status of the patient, often because an emergency surgery is performed and/or there is insufficient time and/or ability to get a preoperative outpatient DEXA scan. Even when there is sufficient time, a DEXA scan is typically not ordered unless there is a high index of suspicion with respect to the patient's bone density, not to mention that it is not routinely recommended in all spine patients.

As such, while the DEXA scan remains the best method to measure bone density, it cannot be performed intraoperatively and is not necessarily a good estimator of bone quality and/or strength. Therefore, it can be beneficial to test and determine a patient's bone quality and/or strength intraoperatively during spine surgery, although there are no devices currently available to do this accurately and reliably. The presently disclosed subject matter solves this problem in that it relates in some embodiments to a device that can be inserted into the bone at precisely the location where implant fixation will be applied and direct measurements of bone quality/strength can be made at multiple sites levels within the bones (e.g., vertebrae). Further, the site specific testing of bone strength will be done in an orientation consistent with the loading direction applied to said bone by the implant after implantation.

SUMMARY

This Summary lists several embodiments of the presently disclosed subject matter, and in many cases lists variations and permutations of these embodiments of the presently disclosed subject matter. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter relates to bone quality and/or strength measuring devices. In some embodiments, the devices comprise a body and a detector disposed therein, wherein the detector is designed to interact with a bone, determine the quality and/or strength thereof, and communicate an evaluation of the bone quality and/or strength to a user.

In some embodiments, the presently disclosed bone quality and/or strength measuring devices further comprise a torque and/or force sensor that facilitates placement of the device adjacent to a region of the bone to be tested and optionally is in communication with the detector to cause the detector to evaluate the bone.

In some embodiments, the bone quality and/or strength measuring device is of a size such that it can be inserted into a bone screw path introduced into the bone.

In some embodiments, the bone quality and/or strength measuring devices of the presently disclosed subject matter further comprise an output that provides a visual, auditory, and/or tactile feedback to a user based on the quality and/or strength of the bone determined by the detector. In some embodiments, the output comprises a visual display that notifies the user that the quality and/or strength of the bone does or does not exceed a pre-selected minimum.

In some embodiments, the bone quality and/or strength measuring devices of the presently disclosed subject matter comprise a piston that interacts with the detector to cause the detector to interact with and thereby evaluate the bone. In some embodiments, the piston is in communication with the torque and/or force sensor to cause the detector to interact with and thereby evaluate the bone in response to user input at the torque and/or force sensor. In some embodiments, the piston is an axial piston or is a glancing piston of a cantilever device. In some embodiments, the piston pushes the detector, resulting in the detector rotating about a rotation point to thereby impart a direct force onto the bone in order to evaluate quality and/or strength of the bone.

In some embodiments of the bone quality and/or strength measuring devices of the presently disclosed subject matter, the bone is a bone of the spine, optionally a vertebra.

In some embodiments of the bone quality and/or strength measuring devices of the presently disclosed subject matter, the device is fabricated at least in part of titanium.

In some embodiments of the bone quality and/or strength measuring devices of the presently disclosed subject matter, the bone quality and/or strength measuring device has a maximum diameter of about 2 mm to about 3 mm.

The presently disclosed subject matter also relates in some embodiments to methods for determining if a region of a bone is appropriate for placement of an orthopedic hardware piece. In some embodiments, the methods comprise determining quality and/or strength of the region of the bone using a bone quality and/or strength measuring device of the presently disclosed subject matter, wherein the region of the bone is appropriate for placement of the orthopedic hardware piece if the quality and/or strength of the region of the bone exceeds a pre-determined minimum threshold. In some embodiments, the bone is a bone of the spine, optionally a vertebra. In some embodiments, the orthopedic hardware piece is a screw.

The presently disclosed subject matter also relates in some embodiments to methods for reducing risk of a complication of spinal surgery associated with failure of an orthopedic hardware piece. In some embodiments, the methods comprise selecting a region of a spinal bone, optionally of a vertebra, for possible placement of an orthopedic hardware piece; determining quality and/or strength of the region of the spinal bone using the bone quality and/or strength measuring device as disclosed herein; and placing the orthopedic hardware piece in the region of the spinal bone if the region of the bone has a quality and/or strength that exceeds a pre-determined minimum threshold. In some embodiments, if the region of the bone has a quality and/or strength that does not exceed a pre-determined minimum threshold, repeating the previously recited steps until a region of the bone that exceeds a pre-determined minimum threshold is identified and then placing the orthopedic hardware piece in the region of the spinal bone; or placing the orthopedic hardware piece in the region of the spinal bone but also performing a salvage strategy that comprises use of multiple points of fixation, use of an orthopedic hardware piece with a greater length than would have been used otherwise, adding one or more cross links to the orthopedic hardware piece, use of one or more anterior column supports, use of undertapping in placement of the orthopedic hardware piece, use of cement augmentation, or any combination thereof.

Thus, it is an object of the presently disclosed subject matter to provide a bone quality and/or strength measuring device that provides visual, auditory, and/or tactile feedback to a user.

An object of the presently disclosed subject matter having been stated herein above, and which is achieved in whole or in part by the presently disclosed subject matter, other objects will become evident as the description proceeds when taken in connection with the accompanying Figures as best described herein below.

BRIEF DESCRIPTION OF THE FIGURES

In FIG. 1A, four screws have been placed in two adjacent vertebrae, with the region of the vertebrae into which the screws have been placed identified by the broken red circles. In FIG. 1B, lucency surrounding screw threads placed in the L4 and L5 vertebrae is clearly visible and are noted with white arrows. The lucency is strong evidence that the screw threads have loosened from the vertebrae.

FIGS. 5A-5C depicts a methodology for testing the performances of the devices of the presently disclosed subject matter using a bone block sandwich of variable bone quality. FIG. 5A is a photograph of an exemplary bone block sandwich with a series of pores that provide a sensor probe path into which a device of the presently disclosed subject matter can be introduced for testing the local strength surrounding the sensor probe path. FIG. 5B is a depiction of exemplary bone qualities that can be introduced into the bone block sandwich of FIG. 5A. The exemplary bone qualities depicted by the different colors presented in FIG. 5B are graphically depicted in FIG. 5C.

FIGS. 6A and 6B are examples of cross-sections of cadaver vertebrae showing the highly variable nature of the interior of a vertebra that can be tested and evaluated with the devices and methods of the presently disclosed subject matter.

FIGS. 7A-7C are depictions of three different types of devices of the presently disclosed subject matter. FIG. 7A provides three different views of a cantilever device of the presently disclosed subject matter that employs an internal piston in an axial position to contact a marking head. FIG. 7B provides three different views of a cantilever device of the presently disclosed subject matter that employs an internal piston in a glancing position to contact a marking head. FIG. 7C provides different views of a collar piston device of the presently disclosed subject matter that employs two different sleeves to produce a mark on bone that has a strength below a certain pre-determined value. The two depictions include one that employs two angled cuts (main panel) and one that employs a single angled cut (lower right).

FIG. 10A is a photograph (top panel) and a schematic (bottom panel) of an exemplary sliding collar embodiment of the presently disclosed subject matter showing various representative dimensions. The text color in the top panel corresponds to the aspect in the lower panel of the same color. FIG. 10B is a series of close up photographs (top panels) and a schematic (bottom panels) of an exemplary sliding collar embodiment of the presently disclosed subject matter. FIG. 10C is a photograph showing materials that can be employed in testing the devices of the presently disclosed subject matter. The blocks in FIG. 10C are commercially available foams of specific strengths and are used to validate measurements of the device.

DETAILED DESCRIPTION

Figure 1B:
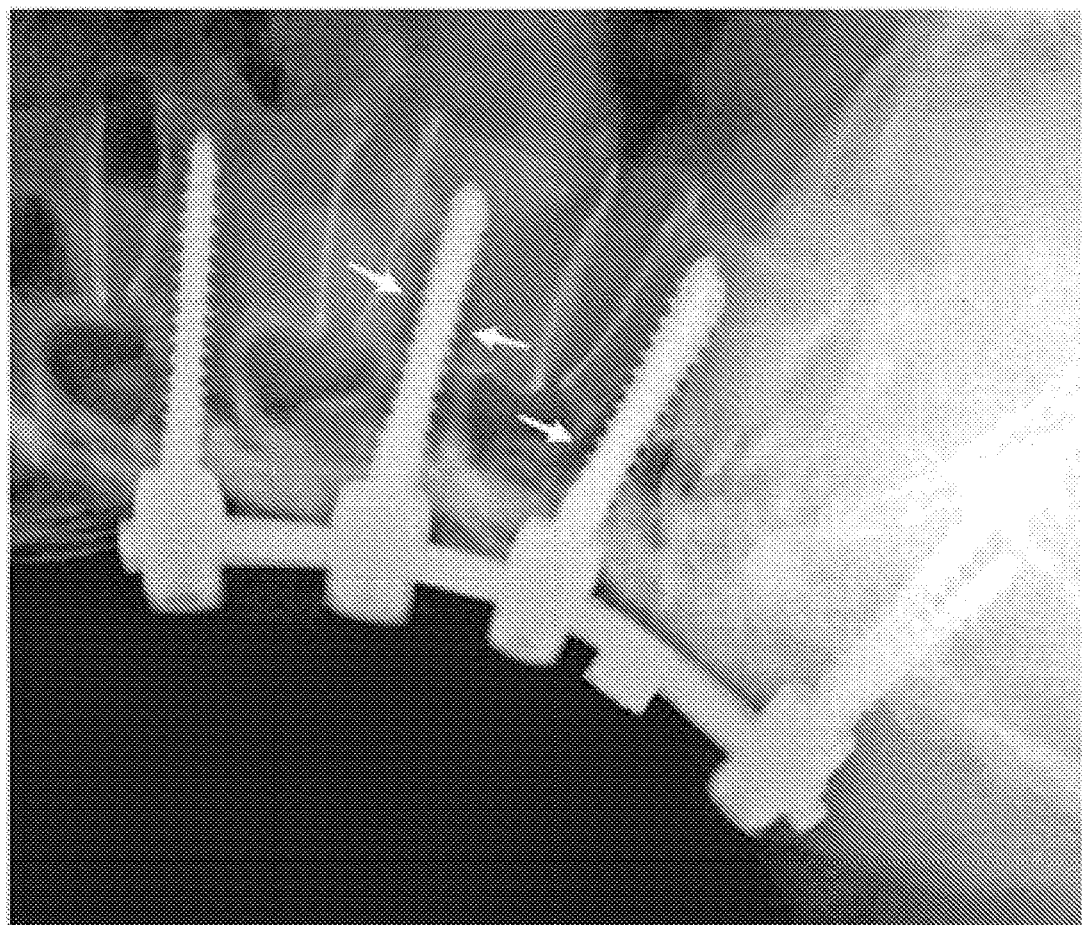
FIGS. 1A and 1B are radiographs of orthopedic screws placed in the vertebrae of a subject.

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. Mention of techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims.

The term "about", as used herein to refer to a measurable value such as an amount of weight, time, etc., is meant to encompass in some embodiments variations of ±20%, in some embodiments ±10%, in some embodiments ±5%, in some embodiments ±1%, in some embodiments ±0.1%, in some embodiments ±0.5%, and in some embodiments ±0.01% from the specified amount, as such variations are appropriate to perform the disclosed methods.

As used herein, the term "and/or" when used in the context of a list of entities, refers to the entities being present singly or in any possible combination or subcombination. Thus, for example, the phrase "A, B, C, and/or D" includes A, B, C, and D individually, but also includes any and all combinations and subcombinations of A, B, C, and D.

The term "comprising", which is synonymous with "including" "containing", or "characterized by", is inclusive or open-ended and does not exclude additional, unrecited elements and/or method steps. "Comprising" is a term of art that means that the named elements and/or steps are present, but that other elements and/or steps can be added and still fall within the scope of the relevant subject matter.

As used herein, the phrase "consisting of" excludes any element, step, or ingredient not specifically recited. For example, when the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of the related disclosure or claim to the specified materials and/or steps, plus those that do not materially affect the basic and novel characteristic(s) of the disclosed and/or claimed subject matter. For example, a method of the presently disclosed subject matter can "consist essentially of" one or more enumerated steps as set forth herein, which means that the one or more enumerated steps produce most or substantially all of the intended result to be produced by the claimed method. It is noted, however, that additional steps can be encompassed within the scope of such a method, provided that the additional steps do not substantially contribute to the result for which the method is intended.

With respect to the terms "comprising", "consisting essentially of", and "consisting of", where one of these three terms is used herein, the presently disclosed and claimed subject matter can include the use of either of the other two terms. Similarly, it is also understood that in some embodiments the methods of the presently disclosed subject matter comprise the steps that are disclosed herein, in some embodiments the methods of the presently disclosed subject matter consist essentially of the steps that are disclosed, and in some embodiments the methods of the presently disclosed subject matter consist of the steps that are disclosed herein.

Disclosed herein are designs of a class of medical devices that can measure bone quality and/or strength intraoperatively during spine surgery. In some embodiments, the devices include software and indicators that provide the user with feedback regarding the severity of bone quality and/or strength deficits that are measured to provide a user (e.g., a spinal surgeon) with guidance to management of undesirably low bone quality and/or strength measurements.

Spine surgery, particularly in osteoporotic patients, can be risky due to failure of bone to support metal implants. Ideally, hardware such as screws, plates, etc. should be placed only at bone areas that are sufficiently strong to bear the loads required for adequate repair. The DEXA scan is the gold standard to evaluate bone quality, but has drawbacks. Particularly, it is not always available, does not measure local bone strength, and assumes bone homogeneity. However, it is clear that bone quality and/or strength is not homogenous (Banse et al., 2001), so even a DEXA scan can provide inadequate information to a surgeon.

Figure 1A:
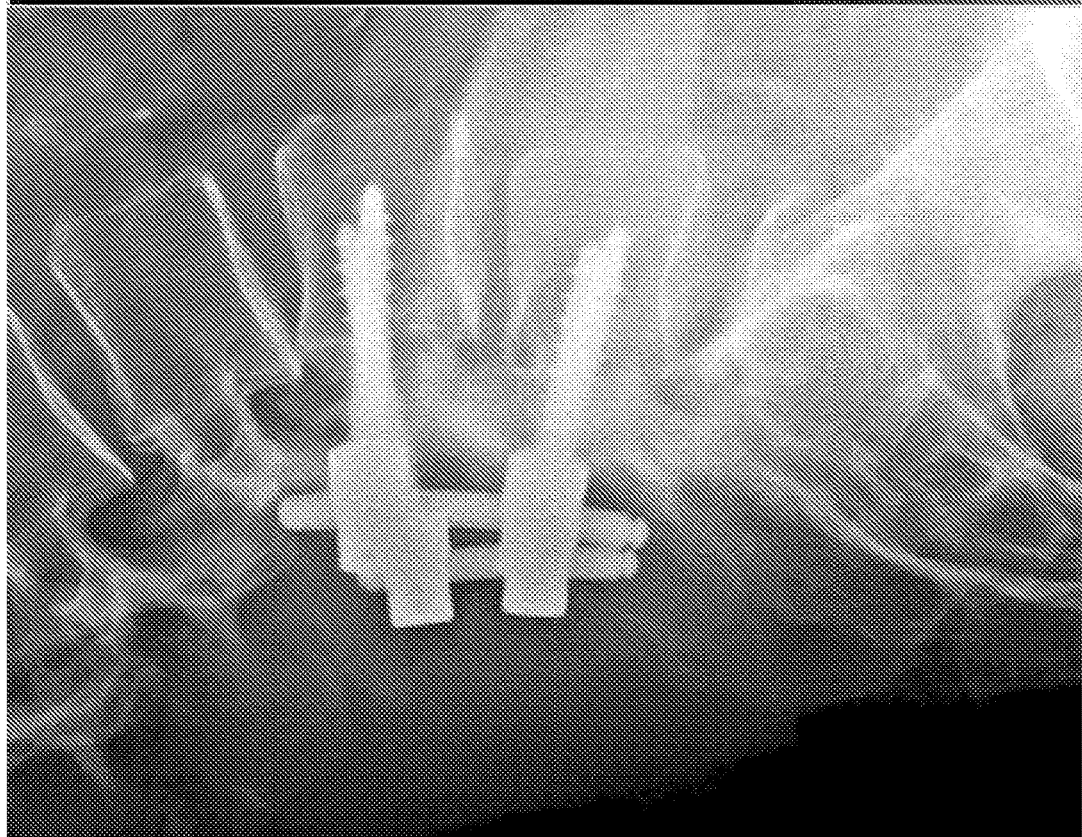

For example, cancellous bone is particularly problematic because even when screws are correctly placed (see e.g., FIG. 1A), loosening around the screw threads can occur over time. This is depicted in FIG. 1B, in which radiographic lucency surrounding L4 and L5 screw threads (indicated with white arrow) is indicative of loosening of the attachment of the screws to the bone.

Several strategies can be employed to address attachment difficulties at areas of weak bone, including but not limited to use of multiple points of fixation, longer constructs, addition of crosslinks, anterior column support, undertapping, and cement augmentation. However, when and which to employ can be unclear during the operative procedure, and as such, bone strength data can better inform a surgeon so the best decisions with respect to orthopedic repair can be made.

Figure 2:
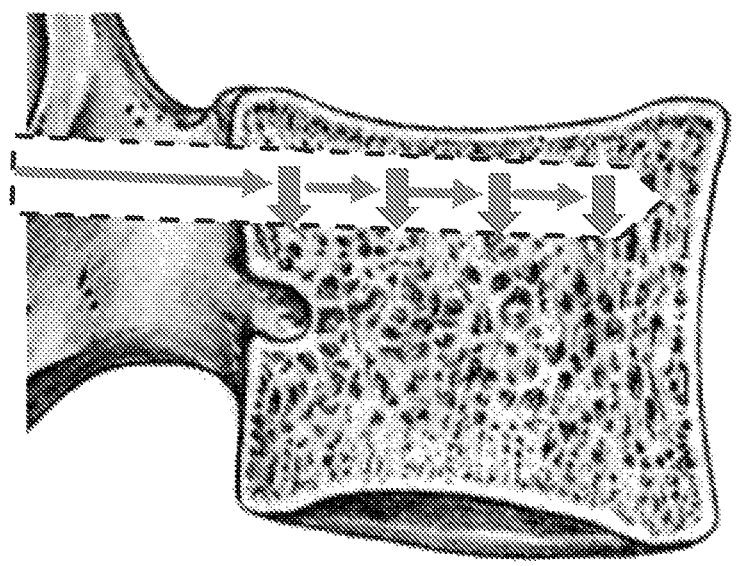
FIG. 2 depicts a method for mechanically testing vertebral body cancellous bone strength along screw path. The horizontal arrows depicts the direction in which the screw path is generated in the vertebral body and thus the direction in which a device of the presently disclosed subject matter can be inserted, with the horizontal arrows showing exemplary regions along the screw path that can be tested for bone strength.

Thus, in some embodiments the presently disclosed subject matter relates to devices and methods for determining bone strength in real time, quickly and specifically along several or many locations under consideration for surgical intervention. By way of example and not limitation, in some embodiments a screw path is mechanically probed to determine vertebral body cancellous bone strength as depicted in FIG. 2, in which horizontal arrows indicate a direction for introducing a device of the presently disclosed subject matter into a vertebra and vertical arrows indicate an exemplary direction in which a device of the presently disclosed subject matter can interact with/interrogate the vertebral body to determine cancellous bone strength.

Figure 3A:
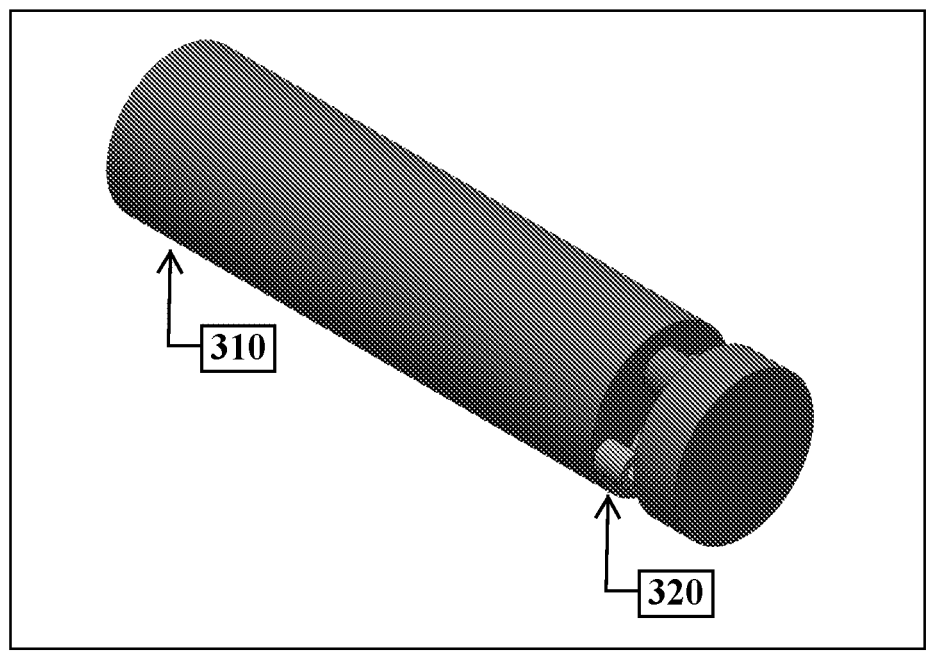
FIGS. 3A and 3B depict exemplary devices of the presently disclosed subject matter.
Figure 3B:
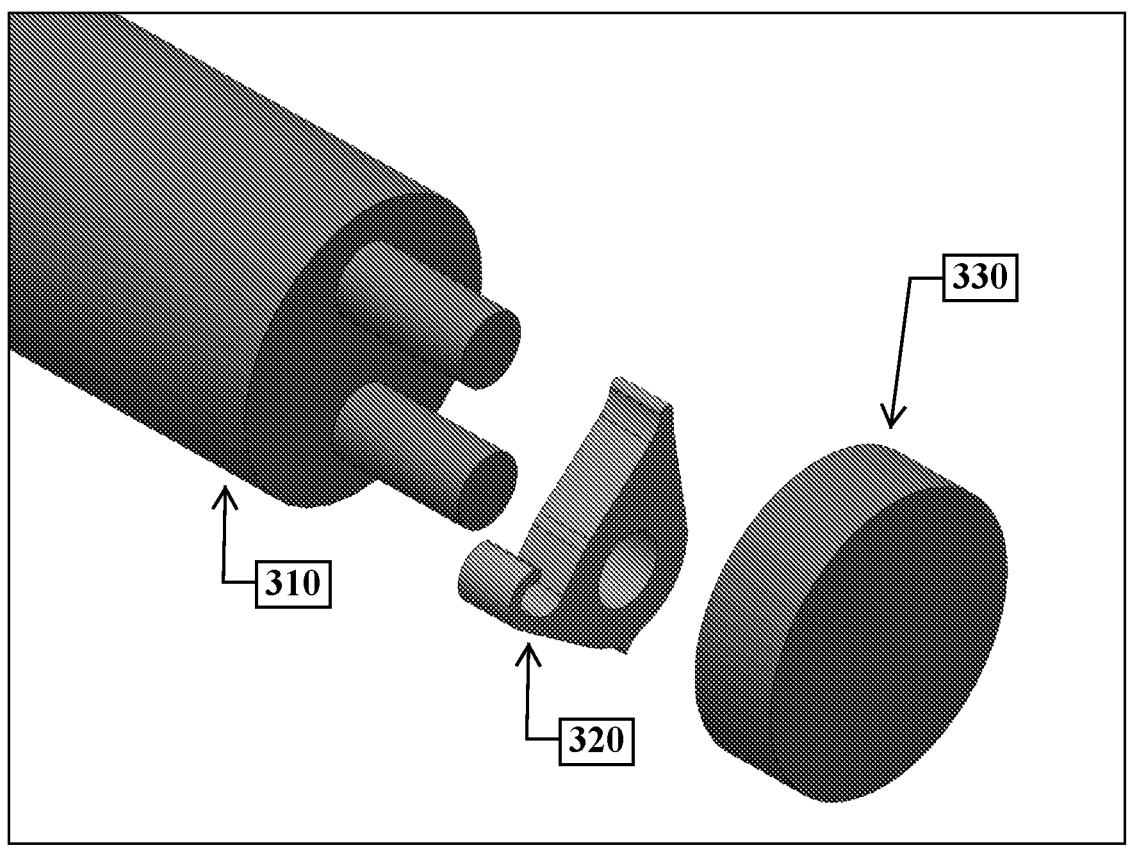
Figure 4:
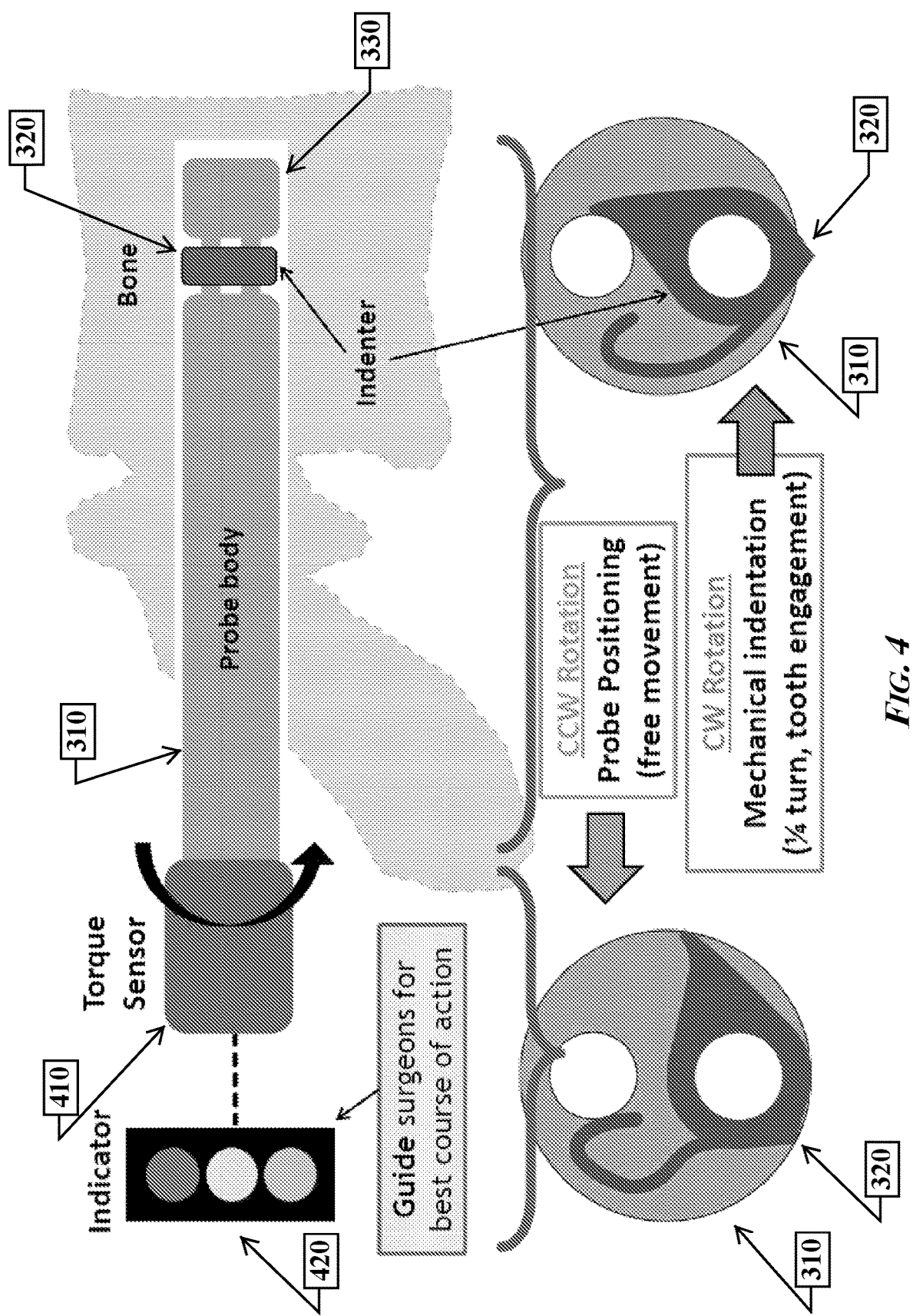
FIG. 4 is a schematic depiction of an exemplary device and method for using the same to measure bone quality and/or strength.

The overall general design concept for a device of the presently disclosed subject matter (optionally called a "probe", a "Vertify probe", or a "sensor") is depicted in FIGS. 3 and 4. With particular reference to FIGS. 3A and 3B, a device of the presently disclosed subject matter is in some embodiments essentially cylindrical and of a size appropriate for insertion into a screw path hole produced in a bone to be tested. Probe body 310 can include removable cap 330 that is positioned to cover indenter 320. As used herein, the terms "indenter" and grammatical variants thereof refer to a component of a device of the presently disclosed subject matter that is designed to interact with a bone and provide a feedback to the probe regarding the suitability of the bone to be used as an attachment point for orthopedic hardware (e.g., a screw). In some embodiments, indenter 320 physically marks (e.g., "indents") the bone if the bone is not suitable to be used as an attachment point for orthopedic hardware (e.g., a screw). However, it is noted that it is not necessary for indenter 320 to generate any physical mark on the bone. Its purpose is merely to interrogate the bone with respect to its suitability, which in some embodiments relates to its quality and/or strength.

In some embodiments, indenter 320 is disposable and designed to be replaced frequently either during use for any particular subject or for use in different subjects at different times. As such, in some embodiments removeable cap 330 facilitates quick and easy remove of a used indenter 320 from probe body 310 and replacement of the same with a new indenter 320, after which removeable cap 330 can be replaced on probe body 310 for subsequent use.

Turning now to FIG. 4, probe body 310 with indenter 320 can be introduced into a bone to be tested (gray). In some embodiments, probe body 310 can further comprise torque and/or force sensor 410 at the end opposite removeable cap 330 and indenter 320, wherein torque and/or force sensor 410 is rotatable in both clockwise and counterclockwise directions relative to the horizontal axis of probe body 310. In some embodiments, a counterclockwise rotation of torque and/or force sensor 410 can be employed to properly position probe body 310 in the bone, whereas clockwise rotations can be employed to engagement indenter 320 with the bone. In some embodiments, the clockwise rotation results in engagement of teeth present in the design of probe body 310 such that every incremental clockwise rotation of torque and/or force sensor 410 (by way of example and not limitation, a one-quarter turn of torque and/or force sensor 410) results in mechanical indentation of the bone.

In some embodiments, torque and/or force sensor 410 further comprises indicator and/or detector 420 that detects whether the mechanical indentation of the bone indicative of the bone being unsuitable to be used as an attachment point for orthopedic hardware (e.g., a screw) is present. In some embodiments, indicator and/or detector 420 acts in a binary fashion with respect to a pre-selected minimum bone quality and/or strength in that if the bone has a quality and/or strength that is less than the pre-selected minimum, indicator and/or detector 420 relays a signal that is observable by the user. In some embodiments, the signal is a visual signal. By way of example and not limitation, if indicator and/or detector 420 acts in a binary fashion to display a visual signal, a light of one color (e.g., red) or type (e.g., flashing) can indicate that the bone is unsuitable, whereas a light of another color (e.g., green) or type (e.g., steady on) can indicate that the bone is suitable. By way of a further example and not limitation, if indicator and/or detector 420 acts in a ternary fashion to display a visual signal, a light of a first color (e.g., red) or type (e.g., off) can indicate that the bone is unsuitable, a light of a second color (e.g., yellow) or type (e.g., flashing) can indicate that the bone is borderline unsuitable, and a light of a third color (e.g., green) or type (e.g., steady on) can indicate that the bone is suitable. Other observable and/or perceptible signals can also be employed, including but not limited to auditory signals and/or tactile signals. Any combination of signals can also be generated by the probe, including signals that are relayed to a receiver that is in wireless communication with probe body 310, is hardwired to probe body 310, or both (e.g., WiFi, Bluetooth, and/or infrared communication).

In some embodiments, the probe body, indenter, torque and/or force sensor, etc. are made of a material that is resistant to degradation by techniques designed to sterilize the devices. Such sterilization techniques include chemical sterilization and heat sterilization (e.g., autoclaving).

The devices and methods of the presently disclosed subject matter are applicable to a full range of spine procedures and not just to measurement during pedicle screw approaches as exemplified herein, and can provide measurements at multiple points. This is in contrast to the DensiProbe (Deckelmann et al., 2010; see also Hoppe et al., 2015), which is limited to a single measurement. In some embodiments, the presently disclosed subject matter allows for vertebral axial compressive strength measurement, which can be important in spinal instrumentation. The DensiProbe device also measures at only one point 15-20 mm in the vertebrae transpedicular direction only, a limitation that is addressed by the presently disclosed subject matter.

Figure 7A:
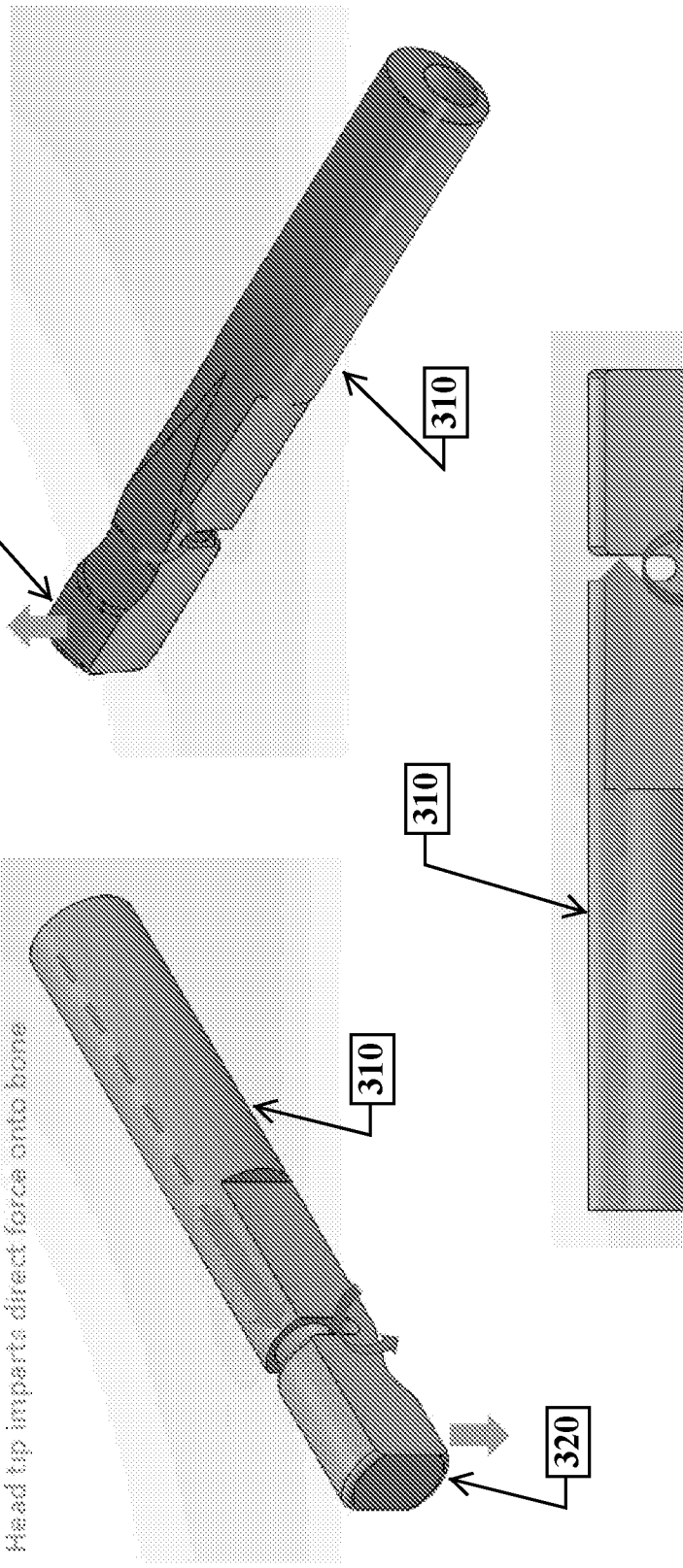
Figure 7C:
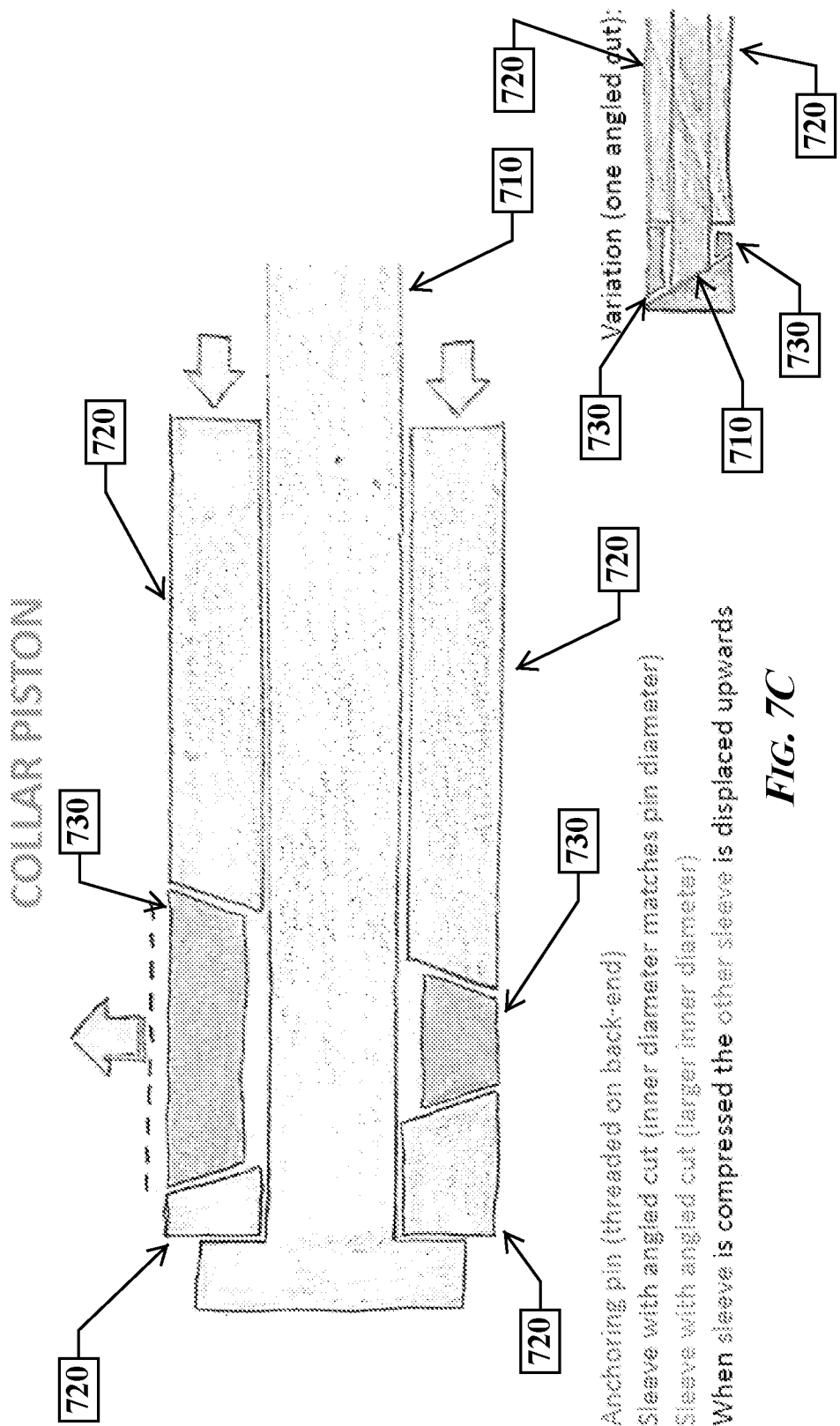

The devices of the presently disclosed subject matter can be constructed in one of several ways. By way of example and not limitation, the device can be designed to include a cantilever with an axial piston (Cantilever AP; see FIG. 7A), can be designed to include a cantilever with a glancing piston (Cantilever GP; FIG. 7B), or can be designed with a collar piston (FIG. 7C).

Figure 8A:
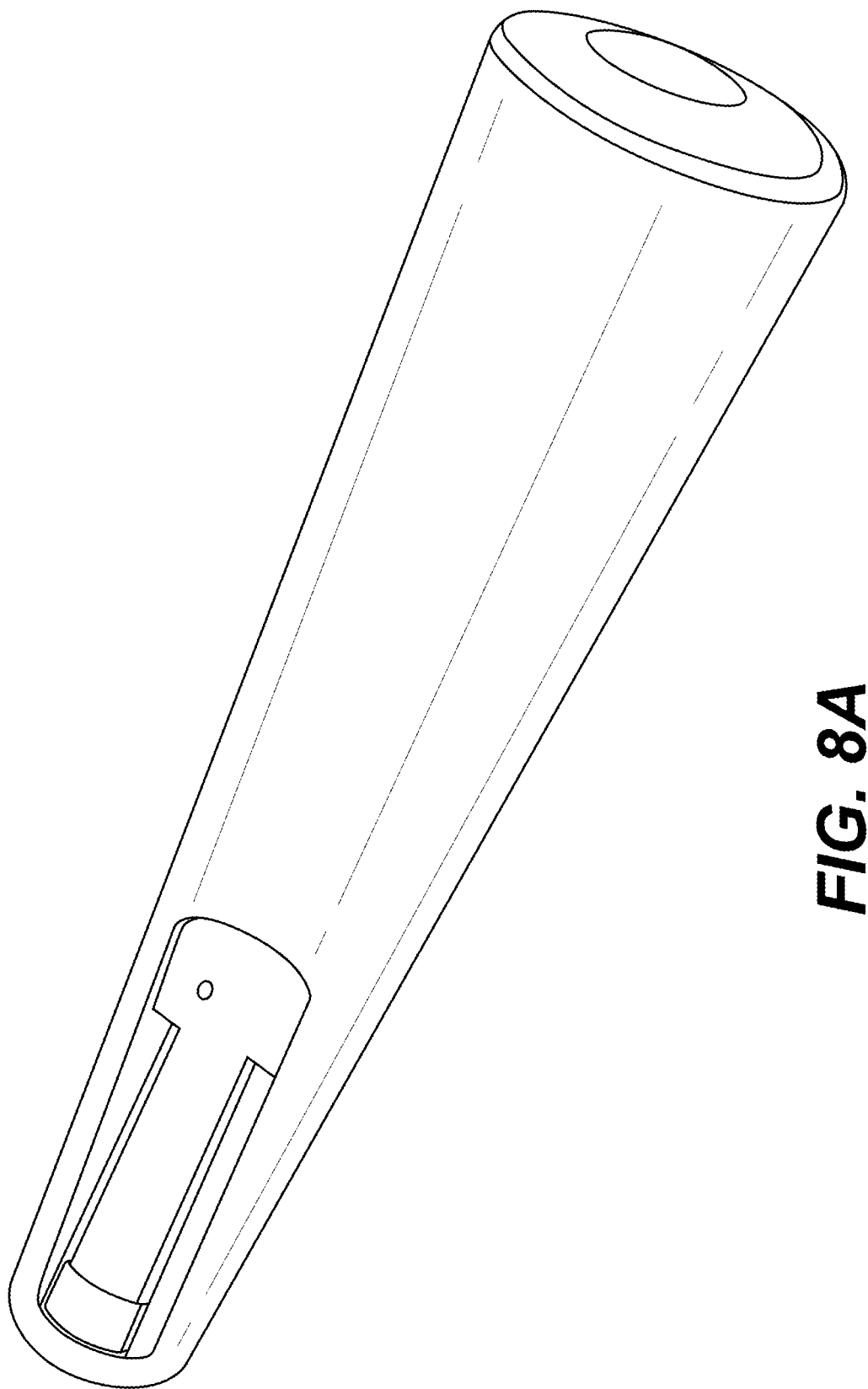
FIGS. 8A and 8B are photographs of an exemplary device of the presently disclosed subject matter.
Figure 8B:
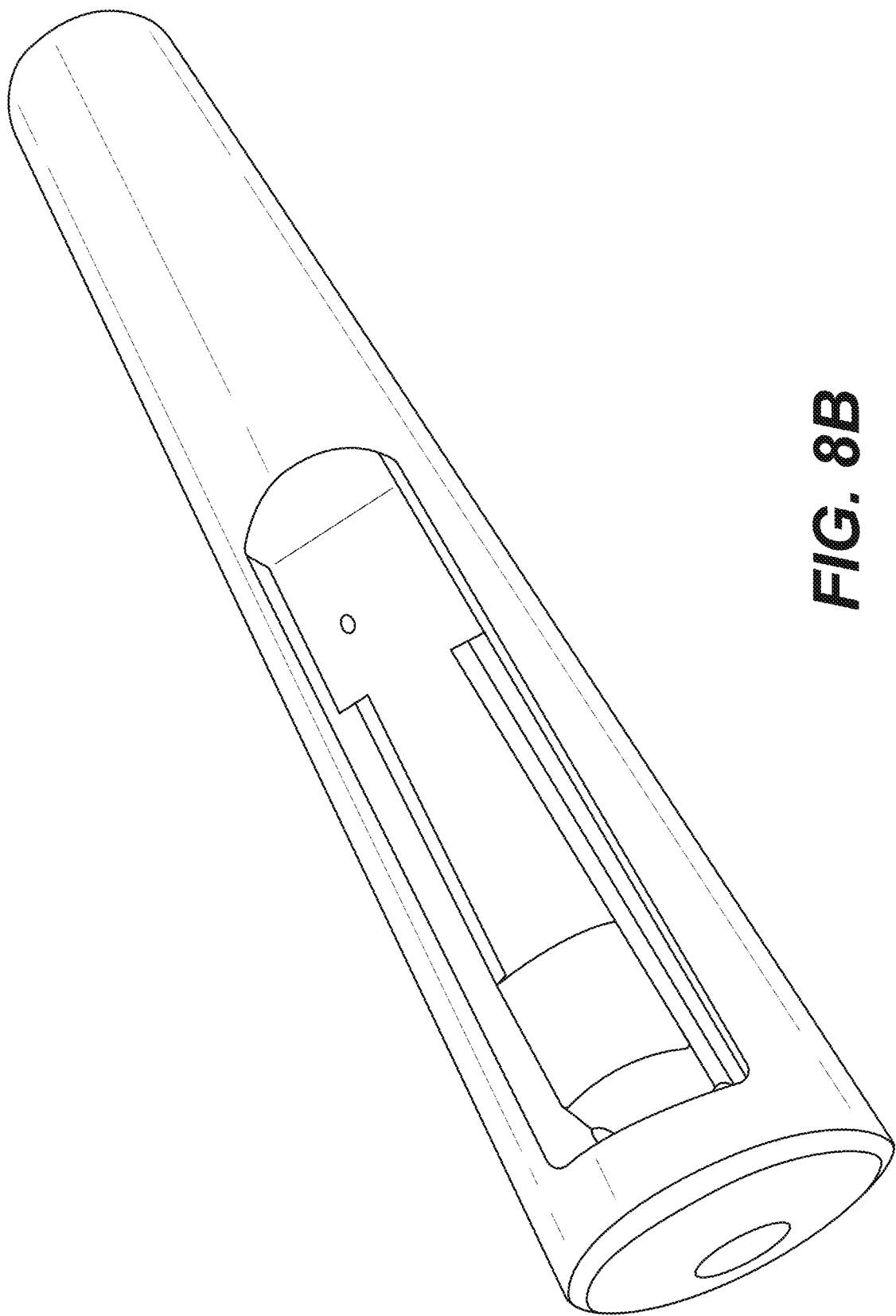

In some embodiments of the cantilever AP or cantilever GP devices, an internal piston (depicted by the dashed arrows) pushes a head, which bends around a rotation point to impart direct force onto a region of a bone to be tested. In some embodiments, the collar piston device of FIG. 7C comprises anchoring pin 710 threaded on the back end, first sleeve 720 with an angled cut, wherein the inner diameter matches the diameter of anchoring pin 710, and second sleeve 730 with an angled cut, wherein second sleeve 730 has a larger inner diameter. In some embodiments, when first sleeve 720 is compressed, second sleeve 730 is displaced upwards. In some embodiments, a variation of the collar piston device comprises a single angled cut (see FIG. 7C, lower right; see also the photographs shown in FIGS. 8A and 8B).

Figure 10A:
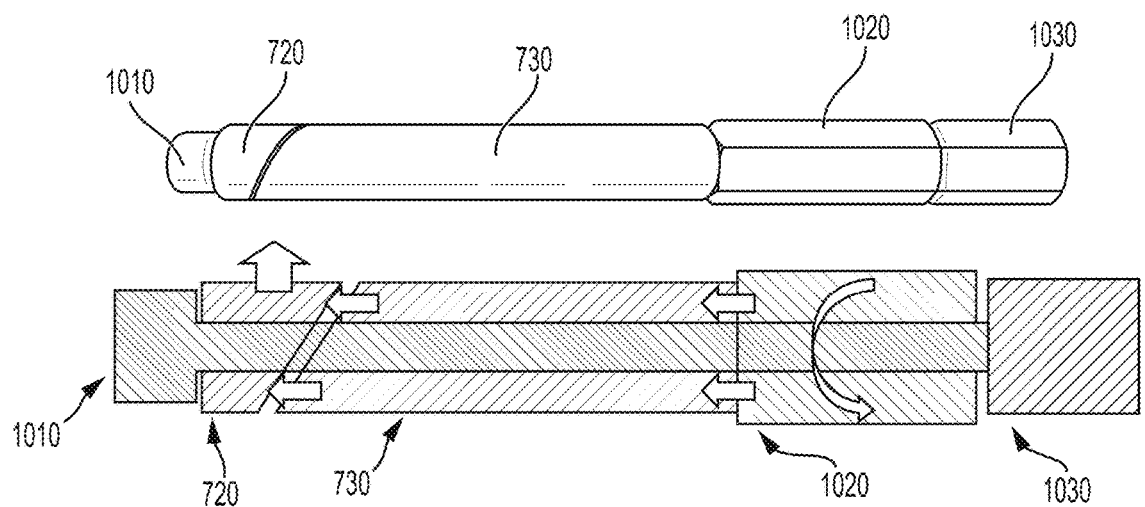
FIGS. 10A-10C depict exemplary sliding collar embodiments of the presently disclosed subject matter, it is modeled after FIG. 7C.
Figure 10B:
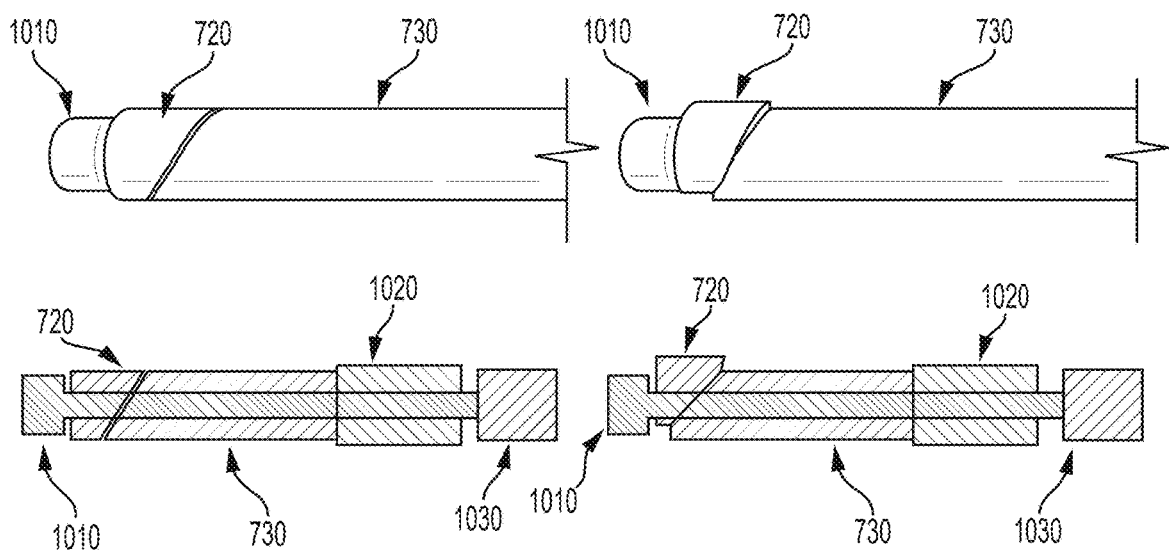

Additional exemplary embodiments of the devices of the presently disclosed subject matter are shown in FIGS. 10A and 10B, 11-14, and 16. With particular reference to FIGS. 10A and 10B, in some embodiments a device of the presently disclosed subject matter comprises screw 1010, first sleeve 720, second sleeve 730, threaded fastener 1020, and fixed/adhered fastener 1030. By way of example and not limitation, screw 1010 can be an M4 screw, first sleeve 720 can have an inner diameter of about 5.0 mm and an outer diameter of about 8 mm, second sleeve 730 can have an inner diameter of about 4.1 mm and an outer diameter of about 8 mm. Rotation of threaded fastener 1020 (semicircular arrow in FIG. 10A) can then cause movement of second sleeve 730 (horizontal arrows in FIG. 10A), which can result in displacement of first sleeve 720 (vertical arrow in FIG. 10A) in order to interact with/interrogate an orthopedic surface (e.g., a bone). Positions of first sleeve 720 prior to displacement and after displacement are shown in FIG. 10B. In some embodiments, displacement of first sleeve 720 can be limited by the interior diameter of first sleeve 720 and the angle present where first sleeve 720 and second sleeve 730 contact each other.

Figure 11:
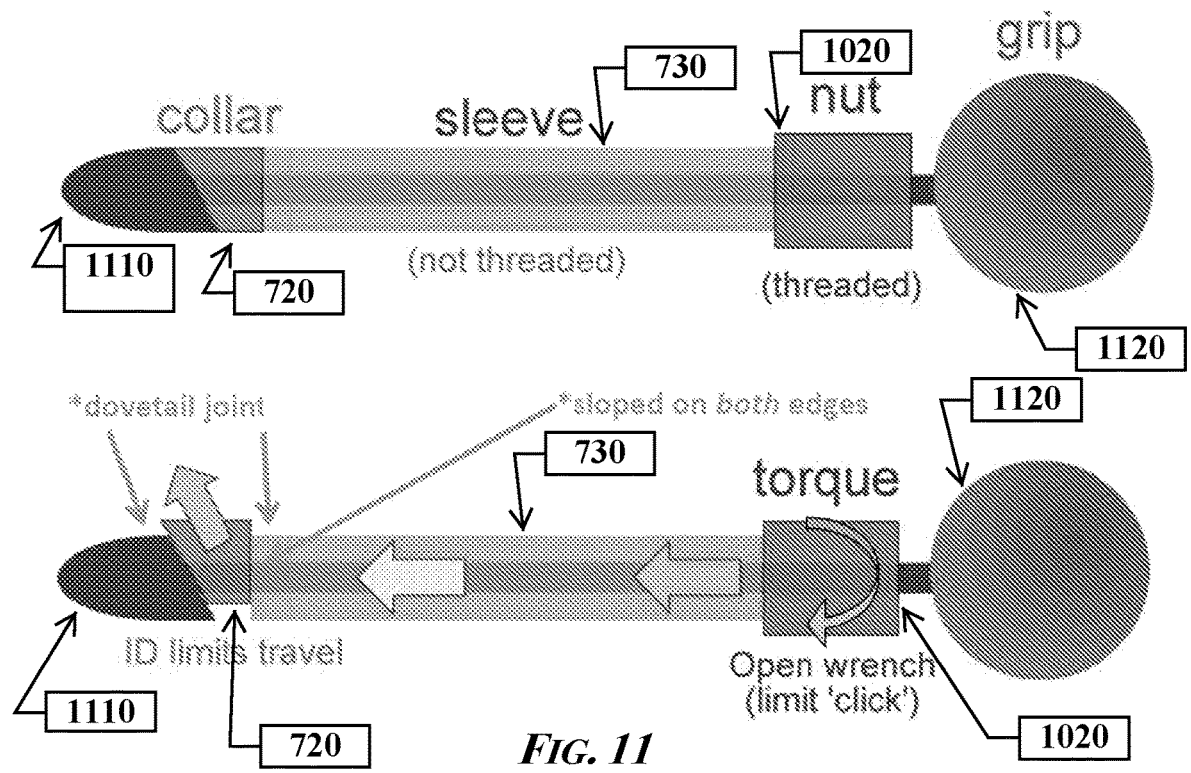
FIG. 11 depict exemplary sliding collar embodiments of the presently disclosed subject matter. The top panel depicts the embodiment prior to use. The bottom panel depicts the embodiment in use, wherein torque and/or force application via the grip is translated down the shaft of the probe body (horizontal arrows), which displaces the collar (arrow point to 11 o'clock) so that it can engage the bone.
Figure 12:
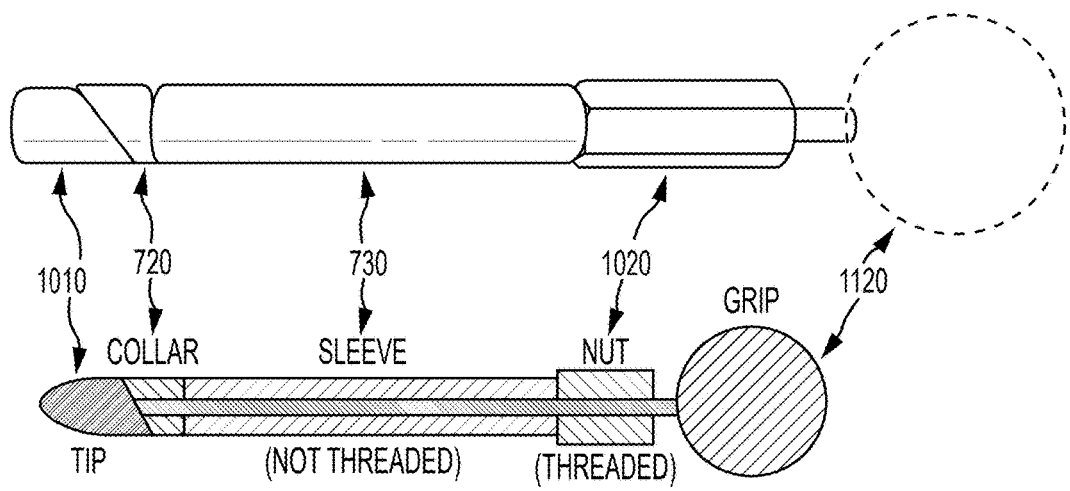
FIG. 12 is a photograph of an embodiment of the presently disclosed subject matter as depicted in FIG. 11.
Figure 13:
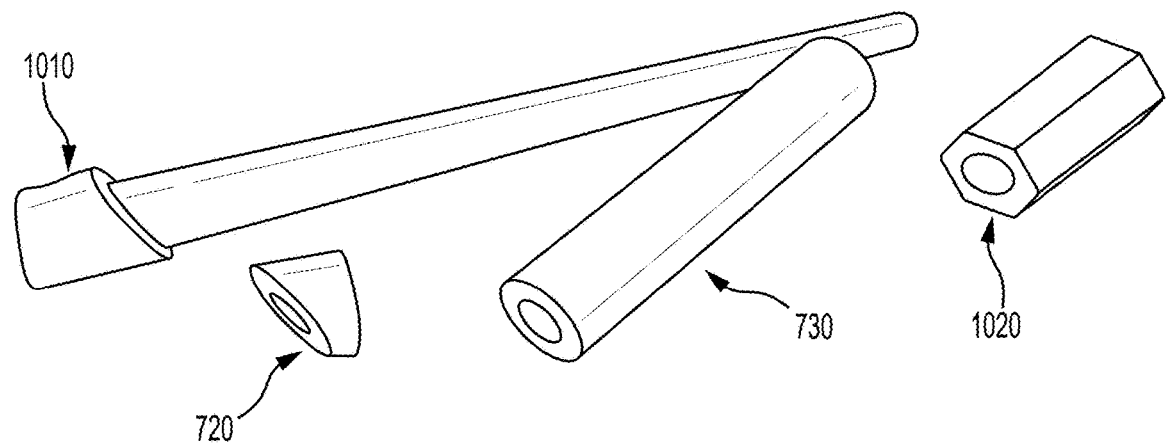
FIG. 13 is a photograph of the various components of the exemplary embodiment of FIGS. 10 and 11 disassembled from each other.

Turning now to FIGS. 11 and 13, in some embodiments a device of the presently disclosed subject matter includes tip 1110, first sleeve 720, second sleeve 730, threaded fastener 1020 (e.g., a nut), and grip 1120. Here as well, rotation of threaded fastener 1020 (indicated by the semicircular arrow in the bottom panel of FIG. 11) can cause movement of second sleeve 730 (horizontal arrows in the bottom panel of FIG. 11), which can result in displacement of first sleeve 720 (arrow in bottom panel of FIG. 11 pointing to 11 o'clock) in order to interact with/interrogate an orthopedic surface (e.g., a bone). Positions of first sleeve 720 prior to displacement and after displacement are shown in the top and bottom panels of FIG. 11, respectively. The position of first sleeve 720 prior to displacement is also shown in FIG. 12. In some embodiments, displacement of first sleeve 720 can be limited by the interior diameter of first sleeve 720 and the angle present where first sleeve 720 and second sleeve 730 contact each other and/or where first sleeve 720 and tip 1110 contact each other. In this regard, the interface between first sleeve 720 and second sleeve 730 can be in some embodiments 90°, and in some embodiments other than 90°. Similarly, the interface between first sleeve 720 and tip 1100 can be in some embodiments 90°, and in some embodiments other than 90°. Although FIG. 11 depicts the interface between first sleeve 720 and second sleeve 730 to be 90° and the interface between first sleeve 720 and tip 1100 to be other than 90°, it is understood that each such interface can be in some embodiments 90° and in some embodiments other than 90°, or any combination thereof. FIG. 13 shows an exemplary device of the presently disclosed subject matter in disassembled form.

Figure 14:
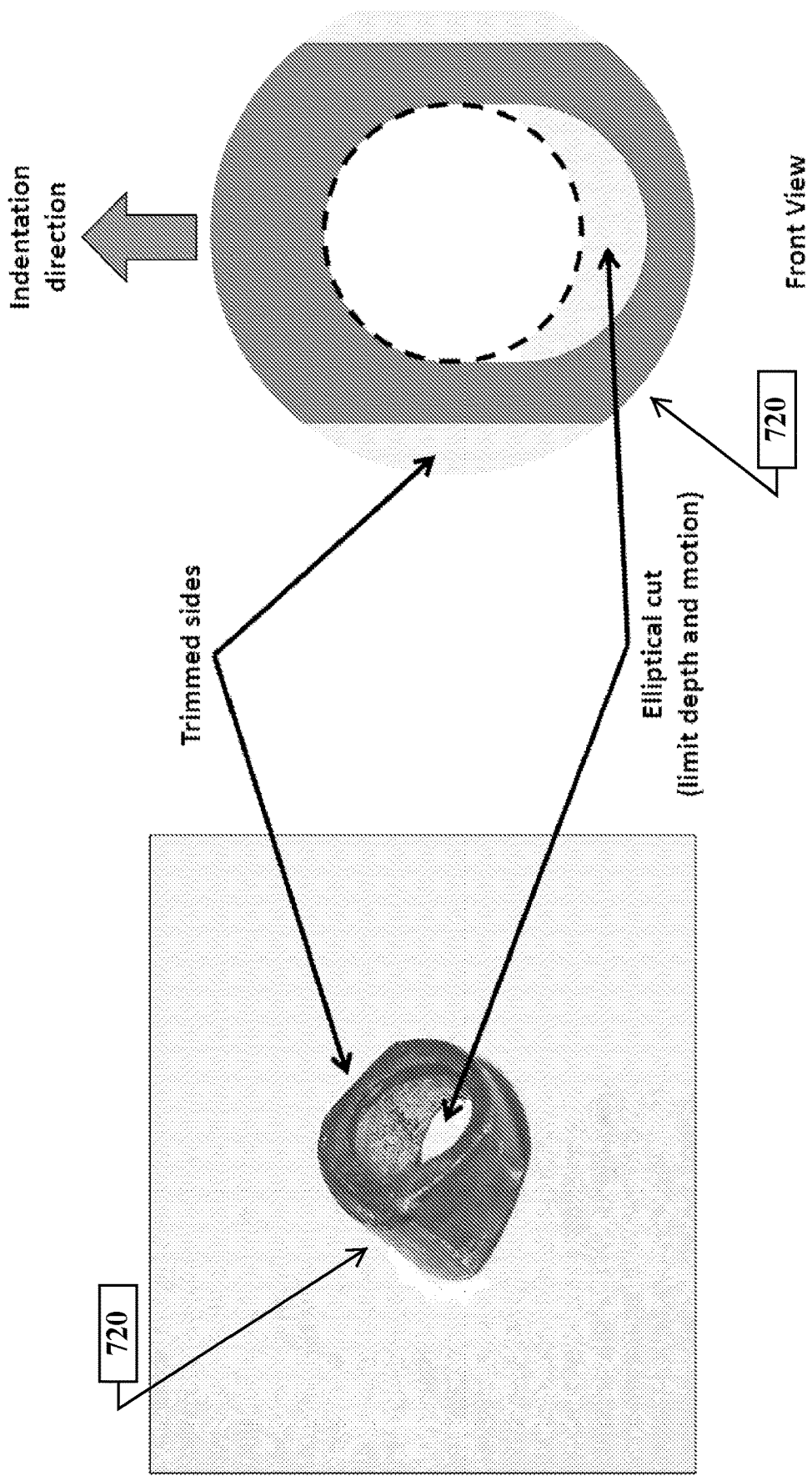
FIG. 14 is a photograph (left panel) and a depiction (right panel) of an exemplary collar of the presently disclosed subject matter. In some embodiments, the geometry of the collar is designed to limit depth and motion of the color in the indentation direction.

With reference to FIG. 14, this Figure shows an example of first sleeve 720, with trimmed sides and with an elliptical cut designed to limit depth and motion.

Figure 16:
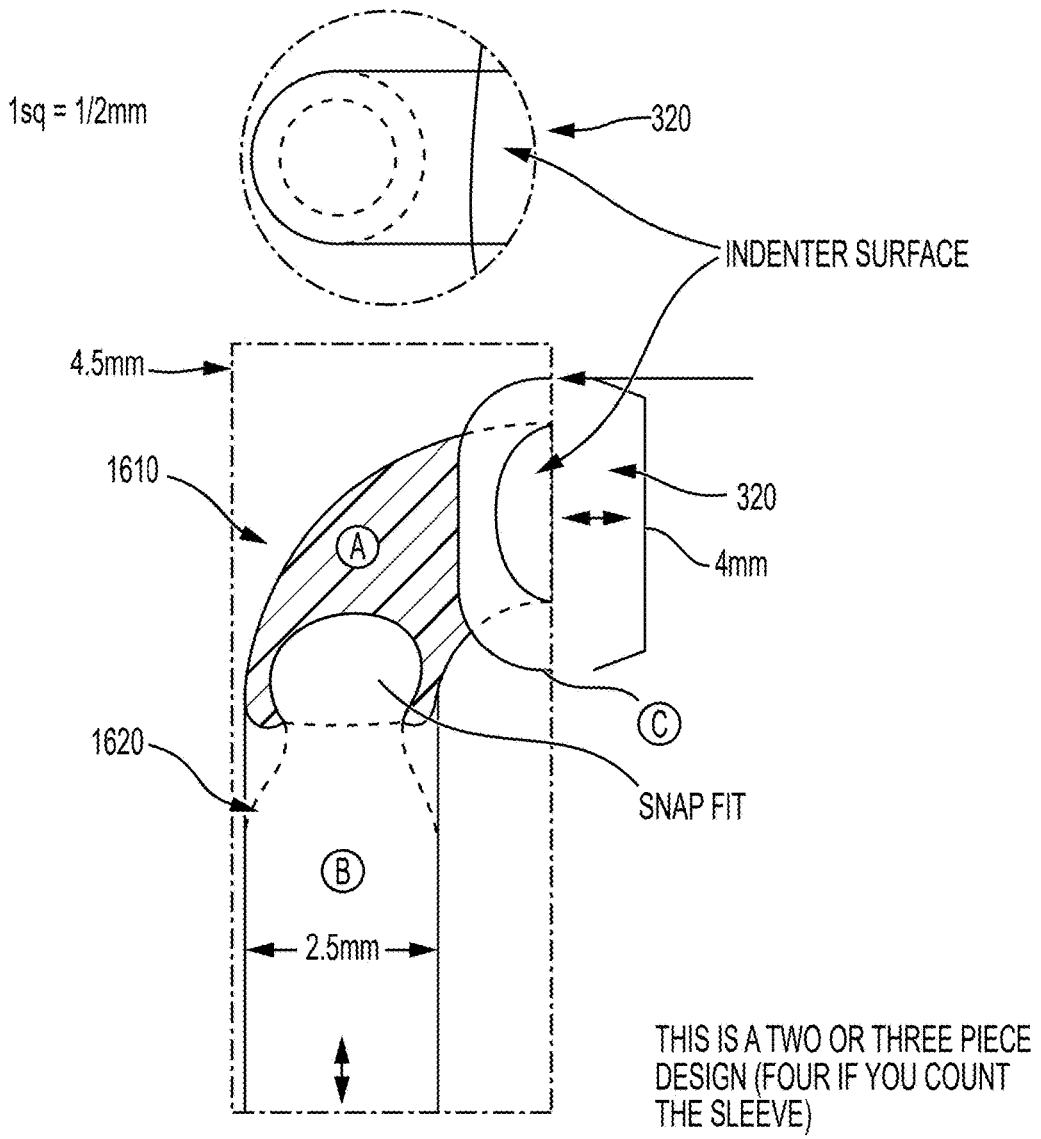
FIG. 16 is a schematic of another embodiment of the presently disclosed subject matter in which push rod 1620 (B) present in the body of the device is designed to fit into a socket in connector 1610, which is depicted in the Figure as a 90 degree arc section (A). This connector 1610 is also connected to indenter 320 (C). The diameters and sizes depicted are understood to be exemplary only.

Turning now to FIG. 16, FIG. 16 is a schematic of another embodiment of the presently disclosed subject matter in which push rod 1620 (B) present in the body of the device is designed to fit into a socket in connector 1610, which is depicted in the Figure as a 90 degree arc section (A). This connector 1610 is also connected to indenter 320 (C). The diameters and sizes depicted in FIG. 16 are understood to be exemplary only. Push rod 1620 (B) can be introduced into the socket in connector 1610 (A) manually using axial force. In some embodiments, connector 1610 is plastic and push rod 1620 has a ball tip, either or both of which is made from plastic or metal.

Figure 10C:
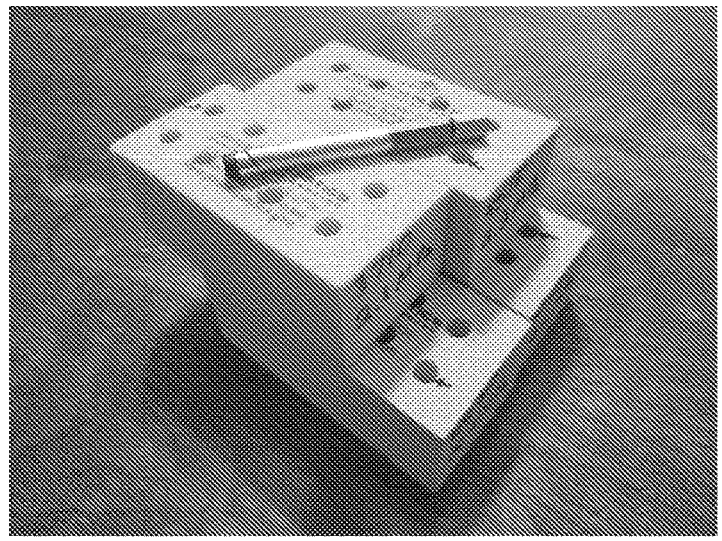
Figure 15:
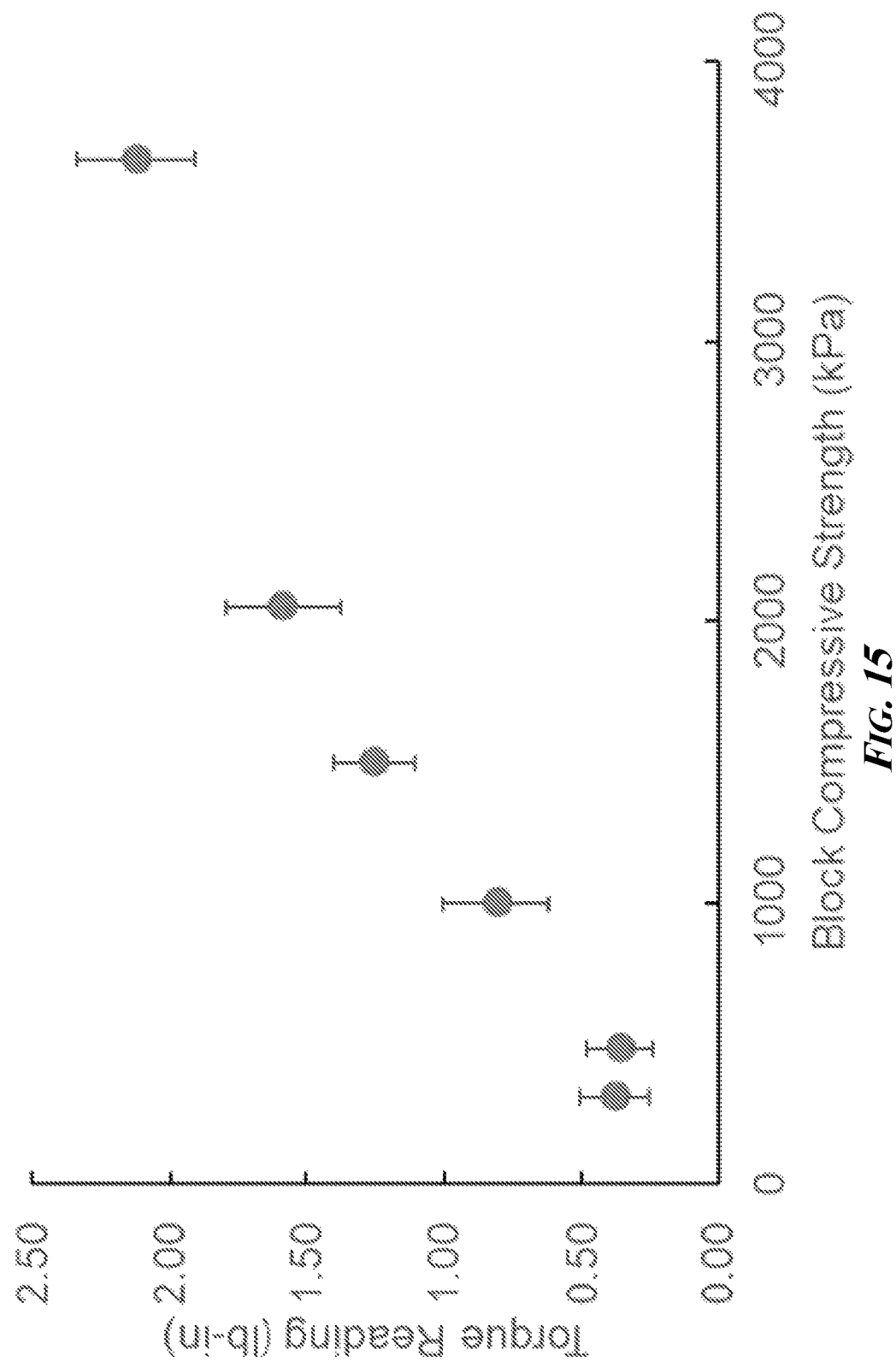
FIG. 15 is a graph showing how exemplary torque and/or force readings can vary with block compress strength. Error bars are ±one standard deviation from five independent tests acquired using the same fabricated device (i.e. measured five holes in a foam block of a certain rigidity; see FIG. 10C) at each block compressive strength value.

Tests of a sliding collar embodiment of the presently disclosed device on the foam blocks depicted in FIG. 10C were performed, and the results are shown in FIG. 15. FIG. 15 is a graph showing how exemplary torque and/or force readings can vary with block compress strength. Error bars are ±one standard deviation from five independent tests acquired using the same fabricated device (i.e. measured five holes in a foam block of a certain rigidity; see FIG. 10C) at each block compressive strength value. Torque/force readings from the exemplary device were easily distinguishable with block compressive strengths of up to at least 4000 kPa.

The presently disclosed subject matter thus identifies and addresses certain underlying causes of pedicle screw failure. Most pedicle screws fail in the cancellous bone near the tip of the screw, especially in osteoporotic bone. Thus, in some embodiments the presently disclosed subject matter directly measures the bone quality at different segments along the screw path. If predictable failure of the cancellous region can be identified, then screw failure or revision surgery can be avoided.

Bone Compression Test: Bone compression tests using cadaver vertebrae were employed in order to ascertain mechanical characteristics of cancellous bone. Based on literature, a 4 $mm^2$ surface area was estimate to require approximately 10 MPa of stress and a deflection above a 0.1 mm to reach the yield point. A compression test using a 6.25 mm diameter cylinder yielded 3.91 MPa of stress, a value consistent with poor bone quality. Additional compression tests determine the potential yield range of cancellous bone. In addition, mechanical characteristics of plastics (e.g., those commercially available from General Plastics, Inc.) that mimic a range of expected mechanical properties of cancellous bone are tested.

Device Design and Testing: Many design concepts were tested before the cantilever-based mechanism disclosed where was employed to directly probe the mechanical properties of the underlying bone. Two exemplary devices are disclosed herein: (1) an "active device" where the surgeon can actively probe sites of interest; and (2) a "passive device" where the surgeon translates the probe through the screw path. Each model can be designed to cause mechanical indentation in weak bone without damaging strong bone.

Figure 9:
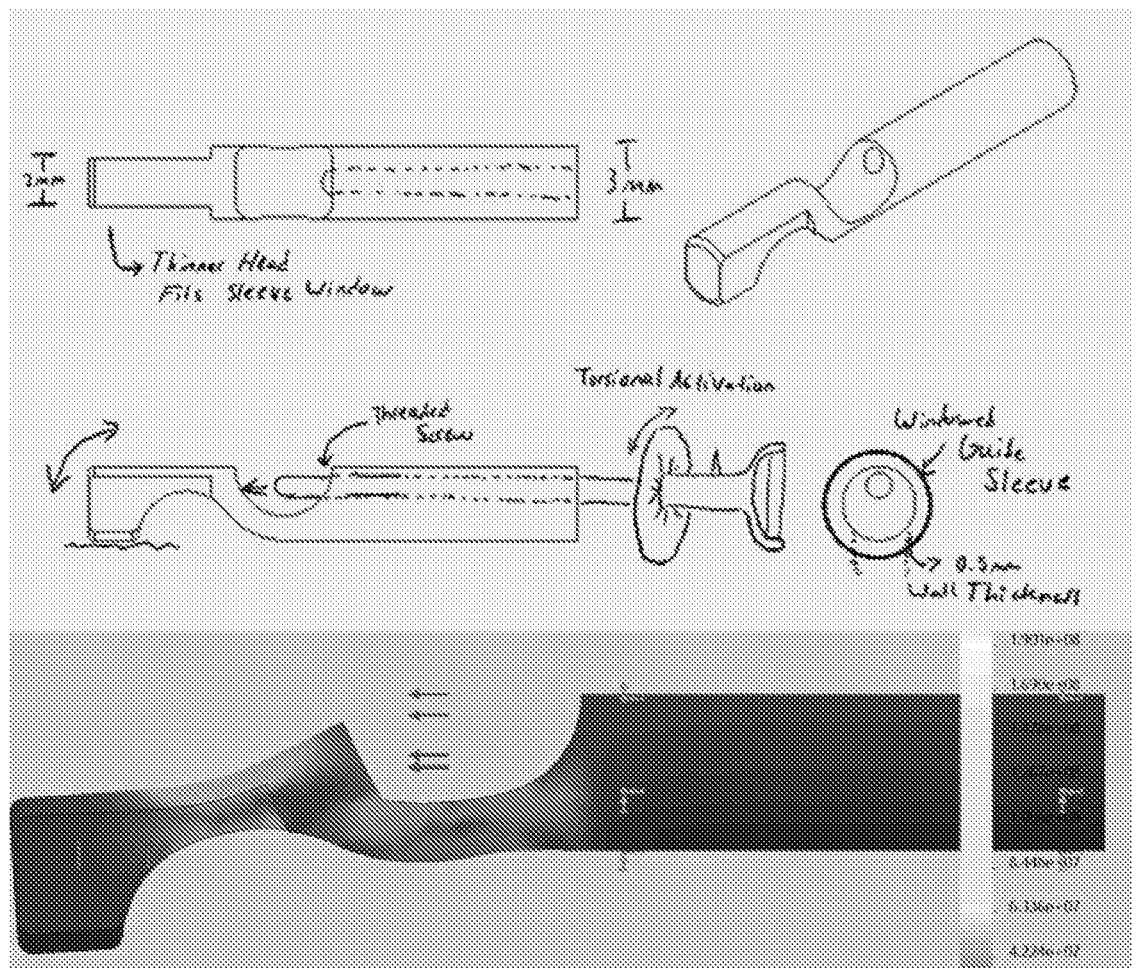
FIG. 9 is a schematic depiction of a device of the presently disclosed subject matter in which certain exemplary numerical values are included.

Active Device Design: The cantilever-like behavior of the active model is driven by a piston to engage indentation (FIG. 9). The piston can be manually controlled by a torque-and/or force-limited torsional mechanism on the back end. Bone strength is determined by measurements of deflection and applied torque and/or force. In some embodiments, the exemplary device has control over both force and displacement; the operator can choose where to engage the indenter along the pedicle screw path within the vertebra.

Passive Device Design: This probe generates a force from passive cantilever flexing. The cantilever probe tip can be initially cocked back and subsequently released once it reaches a set position. The probe translates along the screw path and cantilever deflection (correlating to bone strength) is collected along the path. The tip indents weak bone whereas sufficiently strong bone deflects the cantilever, thus preventing damage to strong (i.e., good) bone. Several probe tip designs have been numerically modeled to deliver a bending moment that results in a 10 MPa load.

Alternative Materials: Testing of true-scale embodiments (approximately 4 mm in diameter) using 3D-printed titanium is performed. Numerical models indicate that stronger materials (i.e., stronger than polymer) can be advantageous to test exemplary devices at the devices' true-scale. Further, surgeons can provide feedback as to their preference towards an active design or passive design.

Force and Deflection Transducers: alternative methods for detecting probe deflection are tested. Two exemplary methods are optically based displacement sensors and strain gauges. The successful implementation of these transducers provides measurements beyond "strong" or "weak", providing precise quantifiable measures of bone quality thus giving the best-possible information to surgeons. Such measurements also enable surgeons to provide the best possible corrective action depending on the degree of bone degradation.

Translation System: to address a mechanism for the controlled displacement of the device, a surgeon can manually insert and translate the probe itself. The development of a thread-based translational system such that a surgeon can manually rotate a collar that precisely translates the probe head according to the thread count of the translating screw is employed. Incorporating the translation system with force and deflection transducers enables sophisticated and unprecedented mechanism of mapping of the interior bone strength.

Testing of Exemplary Devices: both designs were 3D printed with PLA plastic at a larger scale (3×) for assessment. Geometrical modifications were made (based on hands-on observations and numerical models) and incorporated into the next set of scaled-up devices that are printed out of nylon through the University of Louisville's Rapid Prototyping Center. The foam blocks in FIG. 10C are commercially available at a variety of specified strengths. Prototype testing occurs with the insertion of these probes inserted in predrilled holes in the foam blocks. Prototype measurements will be verified with respect to foam block strengths.

3D Printed Devices from Titanium: Numerical models show that a true-scale probe device can created from a stronger material (i.e., stronger than polymers) to generate sufficient forces necessary for proper operation. Titanium devices are thus created via additive manufacturing through the University of Louisville's Rapid Prototyping Center.

Optical Displacement Transducers: Displacement sensors are an exemplary method for measuring probe deflection. Fiber optic displacement sensors from Philtec Fiberoptic Sensors are as small as 0.5 mm in diameter with submicrometer resolution, and can thus be employed in the devices of the presently disclosed subject matter.

Strain Gages: In some embodiments, a strain gage mounted to the probe itself can also provide measurements of deflection. For example, linear strain gages from Micro-Measurements can be as small as 2 $mm^2$ and a variety of configurations are commercially available. In some embodiments, sensing via Wheatstone bridge circuitry is employed.

Torque and/or Force Limited Operation & Precise Translation: In some embodiments, a torque- and/or force-limiting driver is employed in the devices of the presently disclosed subject matter. A variety of commercial torque- and/or force-limiting drivers are available (ex: Bradshaw Medical and In'Tech Medical) to control the force delivered from the active probes of the presently disclosed subject matter. Translation for the rotary probe can involve a simple system consisting of a rotary encoder couples with a threaded collar.

Data Acquisition: In some embodiments, a data acquisition system is employed to simultaneously acquire and log measurements from the probe. The National Instruments USB-6003 multifunction I/O device can be employed for this purpose, with LabView software employed to run the I/O instrument.

Figure 5A:
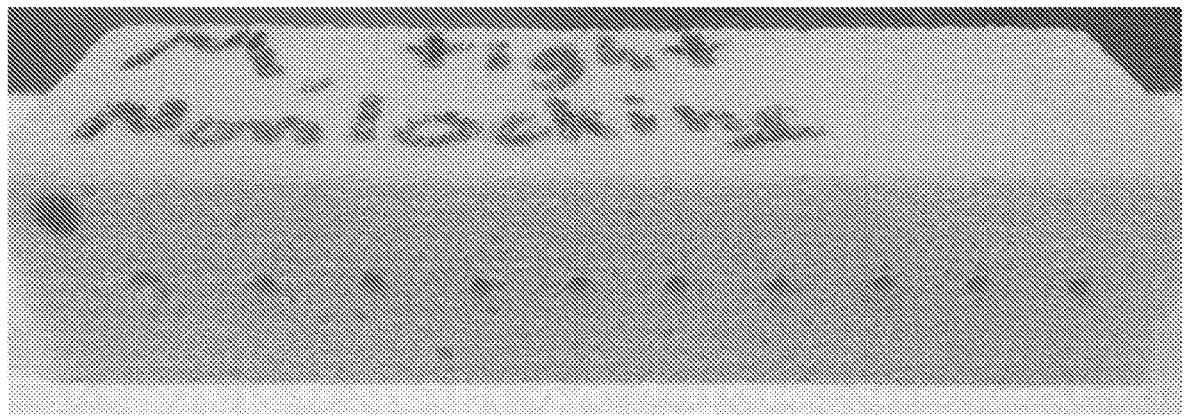
Figure 5B:
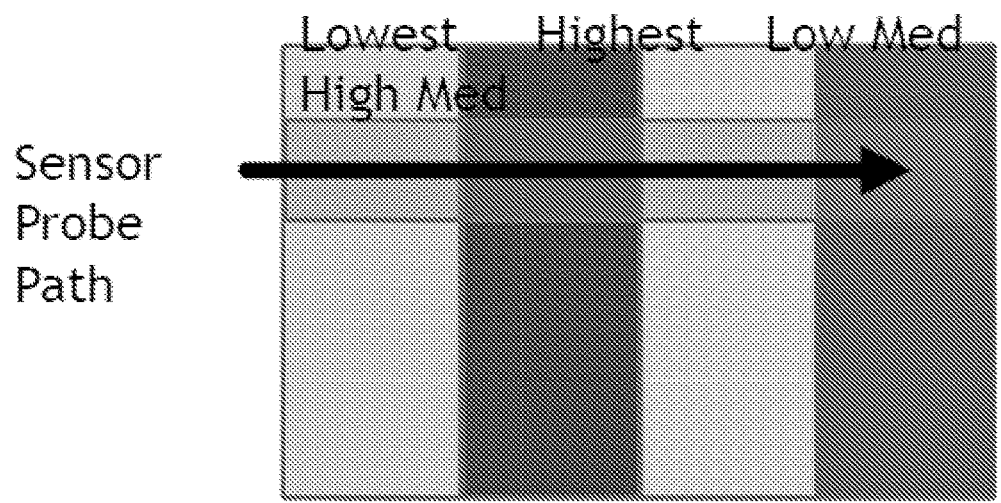

Device Mapping Accuracy: An exemplary device is tested in a randomized bone block sandwich of variable bone quality to test, demonstrate, and validate the exemplary device's mapping accuracy. See FIGS. 5A-5C.

The exemplary device is then deployed in a cadaver spine to demonstrate clinical feasibility. Cadaver vertebrae (examples are shown in FIGS. 6A and 6B) are microCT and/or DEXA scanned to determine bone density, which is correlated to output from the exemplary device deployed.

Summarily, the probes of the presently disclosed subject matter provide at least the following benefits: a competitive advantage over current devices in that direct mechanical measurement of bone quality and/or strength and thus bone suitability for placement of orthopedic hardware is provided; directional measurements in three dimensions can provide better prediction of failure given the non-uniformity in three dimensions of typical bones; the user has the freedom to quickly map multiple sites of interest in real time; and the use of a screw hole as a access point does not destroy the target bone or alter the surgical procedure itself.

REFERENCES

All references listed throughout the instant disclosure, including but not limited to all patents, patent applications and publications thereof, scientific journal articles, and database entries are incorporated herein by reference in their entireties to the extent that they supplement, explain, provide a background for, and/or teach methodology, techniques, and/or compositions employed herein.

Banse et al. (2001) Inhomogeneity of human vertebral cancellous bone: systematic density and structure patterns inside the vertebral body. Bone 28:563-71.

Bjerke et al. (2018) Incidence of Osteoporosis-Related Complications Following Posterior Lumbar Fusion. Global Spine J. 8:563-569.

Deckelmann et al. (2010) DensiProbe Spine: a novel instrument for intraoperative measurement of bone density in transpedicular screw fixation. SPINE 35:607-612.

Fischer et al. (2016) A Systematic Review of Treatment Strategies for Degenerative Lumbar Spine Fusion Surgery in Patients With Osteoporosis. Geriatr Orthop Surg Rehabil. 7:188-196.

Hoppe et al. (2015) Intraoperative mechanical measurement of bone quality with the DensiProbe. J Clin Densitom. 18:109-16.

Kha et al. (2018) Trends in Lumbar Fusion Surgery Among Octogenarians: A Nationwide Inpatient Sample Study From 2004 to 2013. Global Spine J. 8:593-599.

Lehman et al. (2015) Management of osteoporosis in spine surgery. J Am Acad Orthop Surg. 23:253-63.

Martin et al. (2019) Trends in Lumbar Fusion Procedure Rates and Associated Hospital Costs for Degenerative Spinal Diseases in the United States, 2004-2015. SPINE 44:369-376.

Park & Chung, (2011) Strategies of spinal fusion on osteoporotic spine. J Korean Neurosurg Soc. 49:317-322.

Wright et al. (2014) The recent prevalence of osteoporosis and low bone mass in the United States based on bone mineral density at the femoral neck or lumbar spine. J Bone Miner Res. 29:2520-2526.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A bone quality and/or strength measuring device comprising:
   a body; and
   a detector disposed therein,
   wherein the detector is configured to interact with a bone, determine a bone quality and/or strength thereof, and communicate an evaluation of the bone quality and/or strength to a user,
   wherein the body comprises a piston that interacts with the detector to cause the detector to interact with and thereby evaluate the bone.

2. The bone quality and/or strength measuring device of claim 1, further comprising a torque and/or force sensor that facilitates placement of the device adjacent to a region of the bone to be tested and is in communication with the detector to cause the detector to evaluate the bone.

3. The bone quality and/or strength measuring device of claim 2, wherein the piston is in communication with the torque and/or force sensor to cause the detector to interact with and thereby evaluate the bone in response to user input at the torque and/or force sensor.

4. The bone quality and/or strength measuring device of claim 1, wherein the bone quality and/or strength measuring device is of a size such that it can be inserted into a bone screw path introduced into the bone.

5. The bone quality and/or strength measuring device of claim 1, further comprising an output that provides a visual, auditory, and/or tactile feedback to a user based on the bone quality and/or strength determined by the detector.

6. The bone quality and/or strength measuring device of claim 5, wherein the output comprises a visual display that notifies the user that the bone quality and/or strength does or does not exceed a pre-selected minimum.

7. The bone quality and/or strength measuring device of claim 1, wherein the piston is an axial piston or is a glancing piston of a cantilever device.

8. The bone quality and/or strength measuring device of claim 7, wherein the piston pushes the detector, resulting in the detector rotating about a rotation point to thereby impart a direct force onto the bone in order to evaluate the bone quality and/or strength.

9. The bone quality and/or strength measuring device of claim 1, wherein the detector is configured to interact with the bone of a spine.

10. The bone quality and/or strength measuring device of claim 1, wherein the device is fabricated at least in part of titanium.

11. The bone quality and/or strength measuring device of claim 1, wherein the bone quality and/or strength measuring device has a maximum diameter of about 2 mm to about 3 mm.

12. A method for determining if a region of a bone is appropriate for placement of an orthopedic hardware piece, the method comprising determining quality and/or strength of the region of the bone using the bone quality and/or strength measuring device of claim 1,
    wherein the region of the bone is appropriate for placement of the orthopedic hardware piece if the quality and/or strength of the region of the bone exceeds a pre-determined minimum threshold.

13. The method of claim 12, wherein the bone is a bone of the spine.

14. The method of claim 12, wherein the orthopedic hardware piece is a screw.

15. A method for reducing risk of a complication of spinal surgery associated with failure of an orthopedic hardware piece, the method comprising:
    (a) selecting a region of a spinal bone for possible placement of an orthopedic hardware piece;
    (b) determining quality and/or strength of the region of the spinal bone using the bone quality and/or strength measuring device of claim 1; and
    (c) placing the orthopedic hardware piece in the region of the spinal bone if the region of the bone has a quality and/or strength that exceeds a pre-determined minimum threshold; or if the region of the bone has a quality and/or strength that does not exceed a pre-determined minimum threshold;
    (d1) repeating steps (a), (b), and (c) until a region of the bone that exceeds a pre-determined minimum threshold is identified and then placing the orthopedic hardware piece in the region of the spinal bone; or
    (d2) placing the orthopedic hardware piece in the region of the spinal bone but also performing a salvage strategy that comprises use of multiple points of fixation, use of an orthopedic hardware piece with a greater length than would have been used otherwise, adding one or more cross links to the orthopedic hardware piece, use of one or more anterior column supports, use of undertapping in placement of the orthopedic hardware piece, use of cement augmentation, or any combination thereof.

* * * * *